United States Patent
Nagashima et al.

(10) Patent No.: US 8,304,043 B2
(45) Date of Patent: *Nov. 6, 2012

(54) INKJET RECORDING INK AND RECORDING MEDIA SET, INKJET RECORDING METHOD, RECORDED MATTER AND RECORDING APPARATUS

(75) Inventors: Hidefumi Nagashima, Atsugi (JP); Kiyofumi Nagai, Machida (JP); Michihiko Namba, Yokohama (JP); Mariko Kojima, Komae (JP)

(73) Assignee: Ricoh Company, Ltd., Tokyo (JP)

( * ) Notice: Subject to any disclaimer, the term of this patent is extended or adjusted under 35 U.S.C. 154(b) by 711 days.

This patent is subject to a terminal disclaimer.

(21) Appl. No.: 12/300,927

(22) PCT Filed: Mar. 14, 2008

(86) PCT No.: PCT/JP2008/055184
§ 371 (c)(1),
(2), (4) Date: Nov. 14, 2008

(87) PCT Pub. No.: WO2008/114849
PCT Pub. Date: Sep. 25, 2008

(65) Prior Publication Data
US 2009/0258196 A1     Oct. 15, 2009

(30) Foreign Application Priority Data
Mar. 16, 2007   (JP) ................. 2007-069400

(51) Int. Cl.
*B41M 5/00* (2006.01)
(52) U.S. Cl. ............... 428/32.19; 428/32.22; 428/32.26; 428/32.33; 428/32.35; 428/32.36
(58) Field of Classification Search ............... 428/32.19, 428/32.22, 32.26, 32.33, 32.35, 32.36
See application file for complete search history.

(56) References Cited

U.S. PATENT DOCUMENTS

| 7,348,368 B2 | 3/2008 | Kakiuchi et al. |
| 7,837,300 B2 | 11/2010 | Mori |

(Continued)

FOREIGN PATENT DOCUMENTS

EP   1 454 968   9/2004

(Continued)

OTHER PUBLICATIONS

Office Action dated May 17, 2012, in Japanese Application No. 2007-069400.

(Continued)

*Primary Examiner* — Betelhem Shewareged
(74) *Attorney, Agent, or Firm* — Oblon, Spivak, McClelland, Maier & Neustadt, L.L.P.

(57) ABSTRACT

There is provided an inkjet recording ink and recording media set, which contains: an inkjet recording ink; and a recording medium, wherein the inkjet recording ink comprises at least: water; a water-soluble organic solvent; and a colorant containing carbon black, and having a volume average particle diameter of 40 nm to 100 nm, wherein the recording medium contains: a substrate; and a coating layer on at least one side of the substrate, and wherein an amount of pure water transferred to the recording medium, as measured with a dynamic scanning absorptometer at 23 C and 50% RH, at a contact time of 100 ms is 2 ml/m$^2$ to 35 ml/m$^2$ while an amount of pure water transferred to the recording medium at a contact time of 400 ms is 3 ml/m$^2$ to 40 ml/m$^2$.

15 Claims, 6 Drawing Sheets

U.S. PATENT DOCUMENTS

| | | |
|---|---|---|
| 2004/0135846 A1 | 7/2004 | Sekiya |
| 2007/0106962 A1* | 5/2007 | Sakakibara et al. .............. 716/1 |
| 2007/0197685 A1* | 8/2007 | Aruga et al. .................. 523/160 |

FOREIGN PATENT DOCUMENTS

| | | |
|---|---|---|
| EP | 1 784 003 A1 | 5/2007 |
| EP | 1 811 002 A2 | 7/2007 |
| JP | 11 1647 | 1/1999 |
| JP | 2001 348523 | 12/2001 |
| JP | 2002-067472 A * | 3/2002 |
| JP | 2002 97390 | 4/2002 |
| JP | 2002 327138 | 11/2002 |
| JP | 2003 231831 | 8/2003 |
| JP | 2004 25545 | 1/2004 |
| JP | 2004 35716 | 2/2004 |
| JP | 2004-285344 | 10/2004 |
| JP | 2005 42005 | 2/2005 |
| JP | 2005 42098 | 2/2005 |
| JP | 2005 52984 | 3/2005 |
| JP | 2005 163017 | 6/2005 |
| JP | 2005 264115 | 9/2005 |
| JP | 2005 307207 | 11/2005 |
| JP | 2005 336438 | 12/2005 |
| JP | 2006 111691 | 4/2006 |
| JP | 2006 176686 | 7/2006 |
| JP | 2006-281767 | 10/2006 |
| WO | 2006 006682 | 1/2006 |

OTHER PUBLICATIONS

Supplementary European Search Report issued Jul. 5, 2012 in European Application No. 08722552 filed Mar. 14, 2008.

* cited by examiner

INKJET RECORDING INK AND RECORDING MEDIA SET, INKJET RECORDING METHOD, RECORDED MATTER AND RECORDING APPARATUS

TECHNICAL FIELD

The present invention relates to an inkjet recording ink and recording media set that allows the obtaining of a recorded matter having superior image density and glossiness as well as high image quality approaching that of commercial printing such as web offset printing mainly on recording media such as inexpensively available general gloss-coated paper for commercial printing using an inkjet recording apparatus, and to an inkjet recording method, recorded matter and recording apparatus.

BACKGROUND ART

Inkjet recording is known to be a superior recording method that can be applied to a comparatively wide range of recorded materials, and research and development is being actively carried out on recording apparatuses, recording methods, recording materials and the like. At present, ink used for inkjet recording consists mainly of dye ink that uses a dye for the colorant.

On the other hand, the most common type of inkjet recording media is provided with an ink absorbing layer having voids for incorporating ink on a base material, while also being provided with a porous glossy layer as necessary. This type of paper was designed with the emphasis of being compatible with currently popular dye ink, and is already widely used in the form of special-purpose inkjet paper, and particularly glossy paper. Although the use of this paper allows the obtaining of extremely high-definition images having superior glossiness, since the raw materials are extremely expensive while also requiring a complex manufacturing process, the production cost is extremely high as compared with general commercial printing gloss-coated paper. Consequently, the applications thereof tend to be limited to cases requiring the output of photographs or other high-quality output, while being difficult to use in commercial printing fields requiring inexpensive, large-volume output such as leaflets, catalogs and pamphlets.

In addition, with regard to the design concept of the resulting image with respect to long-term storage, since the dye itself has low resistance to ultraviolet light and ozone, the most common approach has been to ensure image shelf life by incorporating the dye as deep as possible in the ink receiving layer of the inkjet recording media to block the effects of the atmosphere and ultraviolet light as much as possible, while also protecting the dye with antioxidants and stabilizers added in advance to the ink receiving layer. Consequently, it is necessary to use a large amount of ink having a decreased concentration of colorant, thereby resulting in increased printing costs. In addition, there have also been problems such as decreased image quality due to bleeding when printing on ordinary paper.

In order to solve such problems, pigment inks that use pigment for the colorant have been proposed in recent years for use as inkjet recording ink. Although this pigment ink has superior image density, water resistance and weather resistance in comparison with dye inks and allows the obtaining of images with little bleeding, since coloring and glossiness are inadequate or considerable time is required for the ink to dry after printing when printing on recording media having a coating layer, these inks had problems such as inferior image fixability.

In order to solve such problems, Patent Literature 1 describes a recording liquid containing a pigment having a particle diameter of 40 nm to 100 nm and a urethane-based resin having superior glossiness, blackness and rubfastness on special-purpose photo quality paper. However, the recording media of the present invention uses inexpensively available, general gloss-coated paper for commercial printing, and does not include special-purpose photo quality paper.

Patent Literature 2 describes superior glossiness, image density, drying and fixability on glossy media by defining the contents of a self-dispersing pigment and resin fine particles. However, if the average particle diameter of the pigment is within the range of 200 nm or less, and particularly in the case of using the pigment having an average particle diameter near 200 nm, the pigment solidifies in the vicinity of the inkjet nozzle thereby resulting in increased susceptibility to the occurrence of defective discharge.

Patent Literature 3 describes superior glossiness and rubfastness of color images on glossy media with a recording liquid containing carbon black and a dispersant in the form of an anionic group-containing styrene-acrylic copolymer. However, since the defined physical values of the media are gloss value and haze value, and the glossy media is special-purpose inkjet paper, there is the potential for the glossiness and rubfastness of color images to be inadequate when printed on the recording media of the present invention.

Carbon black having comparatively low DBP oil absorption, namely low structure carbon black, allows the obtaining of glossy images as a result of orienting comparatively smoothly on paper. For example, although the carbon blacks used in Patent Literature 4 and Patent Literature 5 have comparatively low DBP oil absorption levels allowing the obtaining of high gloss on glossy media, they have the shortcoming of inadequate image density.

Patent Literature 6 and Patent Literature 7 describe superior gloss or rubfastness on special-purpose inkjet paper such as photo paper with a recording liquid containing an aqueous dispersion of water-insoluble vinyl polymer particles containing carbon black. However, the recording ink used in these publications consists primarily of that for printing on ordinary paper, while as was previously described, the recording media of the present invention uses inexpensively available, general gloss-coated paper for commercial printing, and does not include special-purpose glossy or photo quality paper.

Patent Literature 8 describes the use of a colorant containing a self-dispersing pigment or polymer as an inkjet recording method allowing the obtaining of adequate image density regardless of the media, such as ordinary paper or glossy media. Although a more composite black color is obtained than inks mainly using a colorant containing a polymer other than a black polymer in the case the medium is a glossy medium, this differs from a method for obtaining a recorded matter having superior image density and glossiness with black ink as is targeted by the present invention, and does not allow the obtaining of a black color of the composite black having adequate image density and glossiness.

Patent Literature 9 describes an inkjet recording method for printing using a suitable ink corresponding to the type of media such as ordinary paper or glossy media, wherein two black ink nozzles for respectively discharging two different types of black ink are provided on a printing head, and by printing by discharging from the second nozzle a black ink that uses a colorant containing a resin-coated pigment when printing on glossy media, glossy media printed images are obtained having superior fixability. However, since the resin-coated pigment is not specifically defined, there is the potential for being unable to obtain adequate image density and glossiness in the case of mixing in a pigment having a somewhat large particle diameter, for example, as well as the occurrence of problems such as defective discharge due to the pigment solidifying in the vicinity of the inkjet nozzle.

Patent Literature 10 describes an inkjet recording ink containing a self-dispersing carbon black, adsorbed with a water-dispersible high molecular weight compound and which does not pass through a gel filtration chromatography column, and water, wherein the water-dispersible high molecular weight compound has a gel permeation chromatography permeation rate of 20% or less when in a free state from the carbon black. In addition, this publication also discloses to the effect that, although paper recording media is classified into "ordinary paper" and "special-purpose gloss-coated paper", the latter "special-purpose gloss-coated paper" is further classified into "semi-glossy paper" and "glossy paper", this ink can particularly form glossy recorded images on media in the form of "ordinary paper" other than the "special-purpose gloss-coated paper".

Patent Literature 11 describes a composite black ink composing a color printing ink set, wherein the composite black ink is provided with an ink composition (A) containing a self-dispersing carbon black, and an ink composition (B) containing ordinary carbon black and a resin emulsion at 20 times or more the amount of the ordinary carbon black, rub resistance with respect to glossy paper having high planar smoothness being satisfied by the ink composition (A), and coloring and image density being satisfied by the ink composition (B).

Patent Literature 12 describes a recording ink containing an acidic carbon having a low pH and a basic carbon having a high pH, and that a high print density is achieved due to the acidic carbon while ease of nozzle discharge and storage stability are achieved due to the basic carbon.

Patent Literature 13 describes an inkjet recording ink containing dye-colored, water-insoluble aryl (meth)acrylate fine particles having a thiomethyl group on the end of the main chain thereof in an aqueous medium, and that this ink allows to obtain recorded matters having superior print density when printed on ordinary paper and to obtain recorded matters having superior glossiness when printed on glossy paper. Patent Literature 14 describes a black ink that similarly uses the water-insoluble aryl (meth)acrylate and carbon black having a large specific surface are and high DBP oil absorption.

Patent Literature 15 describes an inkjet recording ink that combines the use of a carbon black having a large specific surface area and high DBP oil absorption (highly structured carbon black) and a carbon black having a small specific surface area and low DBP oil absorption (lowly structured carbon black), and that although the former highly structured carbon black is suitable for enhancing OD density of images printed on ordinary paper, the latter lowly structured carbon black compensates for insufficient glossiness, surface roughness and insufficient durability of images printed on glossy paper by the former.

Patent Literature 16 describes that in the case of using two types of ink according to differences in recording media and in the case the recording media is coated paper, printing is carried out with a carbon black pigment ink in the case of printing on ordinary paper with black ink containing a dye.

Patent Literature 17 describes inkjet printing composed of an ink set of an aqueous pigment ink composition (1) and an aqueous clear ink (2) containing only polymer fine particles but not a colorant, wherein the ink set (1) uses a set composed of three members consisting of a thin black ink having a low carbon black concentration (11), a gray-to-gray black ink having an intermediate carbon black concentration (12), and thick black ink having a high carbon black concentration (13).

The use of a plurality of types of ink or the use of a plurality of types of colorants as in Patent Literatures 9 to 17 clearly has various problems.

In this manner, it was difficult to obtain a recorded matter having superior image density and glossiness on a recording media targeted by the present invention as well as high image quality approaching that of commercial printing such as web offset printing.

[Patent Literature]
[Patent Literature 1] Japanese Patent Application Laid-Open (JP-A) No. 2004-285344
[Patent Literature 2] JP-A No. 2004-35716
[Patent Literature 3] JP-A No. 2005-336438
[Patent Literature 4] JP-A No. 2001-348523
[Patent Literature 5] JP-A No. 2002-97390
[Patent Literature 6] JP-A No. 2003-231831
[Patent Literature 7] JP-A No. 2005-42098
[Patent Literature 8] JP-A No. 2002-327138
[Patent Literature 9] JP-A No. 2004-25545
[Patent Literature 10] JP-A No. 2005-163017
[Patent Literature 11] JP-A No. 2005-264115
[Patent Literature 12] JP-A No. 2006-111691
[Patent Literature 13] JP-A No. 2006-176686
[Patent Literature 14] JP-A No. 2005-42005
[Patent Literature 15] JP-A No. 2005-307207
[Patent Literature 16] JP-A No. 11-1647
[Patent Literature 17] JP-A No. 2005-52984

DISCLOSURE OF INVENTION

An object of the present invention is to provide an ink media set that produces a recorded matter having superior image density and glossiness as well as high image quality approaching to that of commercial printing such as web offset printing mainly on recording media such as inexpensively available general gloss-coated paper for commercial printing using an inkjet recording apparatus. Another object of the present invention is to provide an inkjet recording method, recorded matter and recording apparatus using such the ink media set.

The inventors of the present invention found that a recorded matter having high image density and superior glossiness is obtained by recording an image a recording mainly on, for example, inexpensively available general gloss-coated paper for commercial printing using an inkjet recording ink formed by an aqueous dispersion of a colorant containing a carbon black and having a volume average particle diameter within a specific range, thereby leading to a completion of the present invention. In addition, a recorded matter having even higher image density as well as superior pigment fixability can be obtained by adding resin fine particles to the recording ink and retaining the colorant near the paper surface.

Means for solving the above-mentioned problems are as indicated below.

<1> An inkjet recording ink and recording media set, containing:
 an inkjet recording ink; and
 a recording medium,
 wherein the recording ink contains at least:
 water;
 a water-soluble organic solvent; and a colorant containing carbon black, and having a volume average particle diameter of 40 nm to 100 nm,
wherein the recording medium contains:
a substrate; and
a coating layer on at least one side of the substrate, and
wherein an amount of pure water transferred to the recording medium, as measured with a dynamic scanning absorptometer at 23° C. and 50% RH, at a contact time of 100 ms is 2 ml/m$^2$ to 35 ml/m$^2$ while an amount of pure water transferred to the recording medium at a contact time of 400 ms is 3 ml/m$^2$ to 40 ml/m$^2$.

<2> The inkjet recording ink and recording media set according to <1>, wherein the recording ink further contains resin fine particles having a volume average particle diameter of 10 nm to 300 nm.

<3> The inkjet recording ink and recording media set according to <2>, wherein the resin fine particles contains acrylic resin, methacrylic resin, styrene resin, urethane resin, acrylamide resin, polyester resin, butadiene resin or a mixture thereof.

<4> The inkjet recording ink and recording media set according to any of <1> to <3>, wherein the carbon black is coated with a water-insoluble vinyl polymer.

<5> The inkjet recording ink and recording media set according to any of <1> to <4>, wherein the carbon black has a hydrophilic group on the surface thereof, and the hydrophilic group is a functional group selected from the group consisting of —COOM, —SO$_3$M, —PO$_3$HM, —PO$_3$M$_2$, —SO$_2$NH$_2$ and —SO$_2$NHCOR, wherein M represents a hydrogen atom, alkaline metal, ammonium or organic ammonium, and R represents an alkyl group having 1 to 12 carbon atoms, a substituted or unsubstituted phenyl group, or a substituted or unsubstituted naphthyl group.

<6> The inkjet recording ink and recording media set according to any of <1> to <4>, wherein the carbon black is dispersed in the inkjet recording ink by a surfactant.

<7> The inkjet recording ink and recording media set according to any of <1> to <4>, wherein the carbon black has a graft polymer group on the surface thereof.

<8> The inkjet recording ink and recording media set according to any of <1> to <4>, wherein the recording ink contains either a polymeric dispersant having an anionic group or cationic group on the surface thereof, or the carbon black having the surface which is directly or indirectly coated with a compound having an anionic group or cationic group.

<9> The inkjet recording ink and recording media set according to any of <1> to <8>, wherein the recording ink further contains a surfactant.

<10> The inkjet recording ink and recording media set according to any of <1> to <9>, wherein the recording ink has a solid content of 5% by mass to 30% by mass.

<11> The inkjet recording ink and recording media set according to any of <1> to <10>, wherein the recording ink has a viscosity of 5 mPa·s to 20 mPa·s at 25° C.

<12> The inkjet recording ink and recording media set according to any of <1> to <11>, wherein the water-soluble organic solvent is at least one selected from the group consisting of glycerin, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone.

<13> The inkjet recording ink and recording media set according to any of <2> to <12>, wherein the recording ink has a mass ratio A/B of 1/0.05 to 1/1.2, where A represents an amount of the carbon black contained in the recording ink and B represents an amount of the resin fine particles contained in the recording ink.

<14> The inkjet recording ink and recording media set according to any of <1> to <13>, wherein the coating layer of the recording medium has a deposition amount of 0.5 g/m$^2$ to 20.0 g/m$^2$ on solid basis, and a basis weight of 50 g/m$^2$ to 250 g/m$^2$.

<15> An inkjet recording method containing:
depositing an recording ink on a recording medium at an amount of 1.5 g/m$^2$ to 15 g/m$^2$ so as to perform an inkjet recording, using the inkjet recording ink and recording media set according to any of <1> to <14>.

<16> An inkjet recorded matter, having an image density of 2.0 or more and a glossiness of 50 or more at 60° in a solid image part,
wherein the inkjet recorded matter is recorded in accordance with the inkjet recording method according to <15>.

<17> An inkjet recording apparatus, containing at least:
an ink ejecting unit configured to apply a stimulus to a recording ink so as to eject the recording ink to thereby record an image,
wherein the inkjet recording apparatus produces the inkjet recorded matter according to <16>.

<18> The inkjet recording apparatus according to <17>, wherein the stimulus is at least one selected from heat, pressure, vibration and light.

<19> The inkjet recording apparatus according to <17> or <18>, further containing an inverting unit configured to invert a recording surface of a recording medium so as to perform duplex printings.

<20> The inkjet recording apparatus according to any of <17> to <19>, wherein the ink ejecting unit contains a recording head which ejects the recording ink, and the head has a nozzle plate in which an ink discharge surface thereof is subjected to a water-repellent treatment.

<21> The inkjet recording apparatus according to <20>, wherein the water-repellent treatment is carried out by a method selected from a PTFE-Ni eutectoid plating, a fluorine resin treatment and a silicone resin treatment.

<22> The inkjet recording apparatus according to any of <17> to <21>, further containing an endless conveyor belt and a conveying unit configured to charge a surface of the endless conveyor belt and to convey a recording medium while holding the recording medium on the surface of the endless conveyor belt.

<23> The inkjet recording apparatus according to any of <17> to <22>, further containing a subtank for supplying an ink, wherein the subtank is disposed on the recording head, and the inkjet recording ink is replenished into the subtank from an ink cartridge through a supply tube.

According to the present invention, a recorded matter having particularly high image density and particularly superior glossiness can be obtained by selectively combining a "specific recording medium that is neither ordinary paper or glossy paper" and a "specific colorant that uses a carbon black having a specific particle diameter range". Namely, a recorded matter having high image density and superior glossiness is obtained by printing an image mainly on, for example, inexpensively available general gloss-coated paper for commercial printing, using a recording ink formed by an aqueous dispersion of a colorant containing carbon black and having a volume average particle diameter within a specific range, and a printed matter having even higher image density as well as superior pigment fixability can be obtained by adding resin fine particles to the recording ink and retaining a pigment near the paper surface, thereby demonstrating extremely superior effects.

BEST MODE FOR CARRYING OUT THE INVENTION

Figure 1:
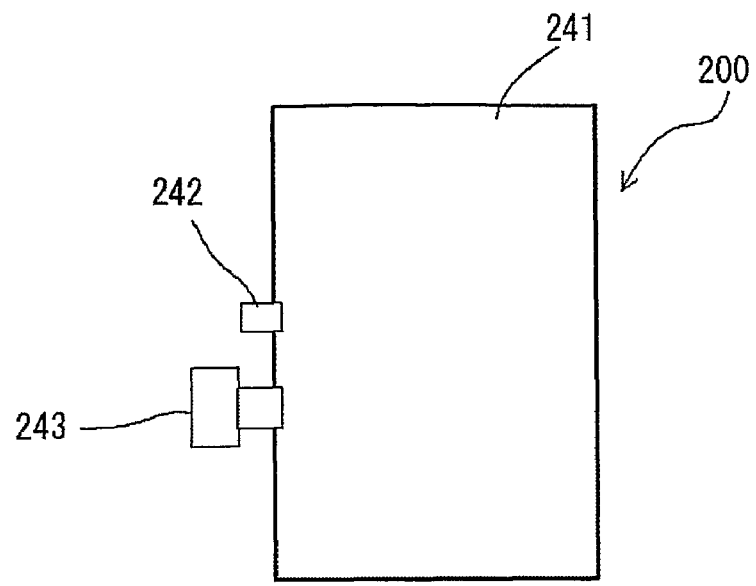
FIG. 1 is a schematic drawing showing an example of an ink cartridge for use in the present invention.

The present invention provides an inkjet recording method that produces a recorded matter by ejecting droplets of an inkjet recording ink (hereinafter, also referred as a recording ink) from an inkjet recording apparatus, and depositing the ink droplets to a recording medium, wherein the recording ink uses a recording ink containing at least water, a water-soluble organic solvent, a colorant containing a carbon black and having a volume average particle diameter within a specific range, a surfactant, resin particles, and as necessary, other components, and the recording medium uses a recording medium in which the amount of pure water transferred to the recording medium at a contact time of 100 ms as measured with a dynamic scanning absorptometer at 23° C. and 50% RH is 2 ml/m$^2$ to 35 ml/m$^2$, and the amount of pure water transferred to the recording medium at a contact time of 400 ms is 3 ml/m$^2$ to 40 ml/m$^2$.

The carbon black for use in the present invention is, for example, a carbon black produced by the conventional production method thereof, such as a channel method, oil furnace method, furnace method, acetylene black method or thermal black method, or the like.

The carbon black for use in the present invention is surface treated by directly or via another atomic group, bonding at least one hydrophilic group on the surface thereof, so that the carbon black can be stably dispersed in the inkjet recording ink without using a dispersant.

Examples of the surface treatment include: an oxidation treatment in which the carbon black is treated by adding the same to an aqueous solution of an oxidant that is an alkaline metal salt such as a hypochlorite, chlorite, chlorate, persulfate, perborate or percarbonate, or an ammonium salt; a low-temperature oxidation plasma treatment; and oxidation method by using ozone.

Examples of the hydrophilic group include —COOM, —SO$_3$M, —PO$_3$HM, —PO$_3$M$_2$, —SO$_2$NH$_2$ and —SO$_2$NHCOR (wherein M represents a hydrogen atom, alkaline metal, ammonium or organic ammonium, and R represents an alkyl group having 1 to 12 carbon atoms, a substituted or unsubstituted phenyl group, or a substituted or unsubstituted naphthyl group). Among these, the carbon black having —COOM or —SO$_3$M bound to the surface thereof is used preferably.

Examples of the alkaline metal represented by "M" in the above-mentioned hydrophilic groups include lithium, sodium and potassium. Examples of the above-mentioned organic ammonium include mono- to tri-methyl ammonium, mono- to tri-ethylammoniumn and mono- to tri-methanol ammonium. In addition, a cationic hydrophilic group can also be introduced by reacting a diazolinium salt using a method for bonding an N-ethylpyridyl group represented by the following structural formulas by treating the carbon black with 3-amino-N-ethylpyridium bromide. A preferable example of the cationic hydrophilic group is a quaternary ammonium group, a more preferable example is a quaternary ammonium group indicated below, and all of these that have been bound to a pigment surface are preferable as coloring materials.

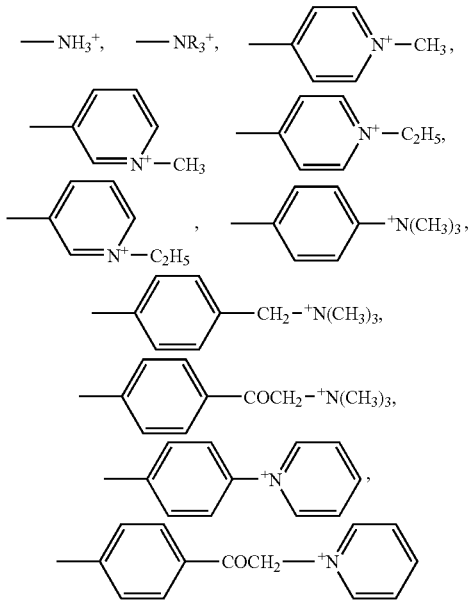

Although examples of the method for producing the carbon black capable of being dispersed in water in the absence of a cationic dispersant bonded with the above-mentioned hydrophilic group include a method for bonding an N-ethylpyridyl group represented by the following structural formula in the form of a method for treating the carbon black with 3-amino-N-ethypyridium bromide, the present invention is naturally not limited thereto.

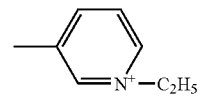

In addition, the carbon black used in the present invention can be dispersed in an aqueous medium by a surfactant. Although an anionic surfactant or nonionic surfactant is mainly used for the surfactant, the present invention is not limited thereto, and the surfactant can be used alone or in the combination of two or more.

Examples of the anionic surfactant include polyoxyethylene alkyl ether acetates, dodecylbenzene sulfonates, laurates and polyoxyethylene alkyl ether sulfates.

Examples of the nonionic surfactant include polyoxyethylene alkyl ethers, polyoxyethylene alkyl esters, polyoxyethylene sorbitan fatty acid esters, polyoxyethylene alkyl phenyl ethers, polyoxyethylene alkyl amines and polyoxyethylene alkyl amides.

In addition, the inkjet recording ink used in the present invention can be dispersed in an aqueous medium of the recording ink by a polymeric dispersant, particularly the one having an anionic group or cationic group on the surface thereof. Alternatively, the surface of the carbon black is either directly or indirectly coated with a compound having an anionic group or cationic group so that the carbon black is dispersed in the aqueous medium of the recording ink.

Any compound can be used as the compound having an anionic group, provided that it is a water-soluble resin having a function (having an anionic group) that stably disperses a pigment in water or aqueous medium. The weight average molecular weight of such the compound is preferably 1,000 to 30,000, and more preferably 3,000 to 15,000.

Specific examples thereof include: hydrophobic monomers such as styrene, styrene derivatives, vinylnaphthalene, vinylnaphthalene derivatives or aliphatic alcohol esters of α,β-ethylenic unsaturated carboxylic acids; block copolymers, graft copolymers, or random copolymers consisting of two or more monomers selected from the group consisting of acrylic acid, acrylic acid derivatives, maleic acid, maleic acid derivatives, itaconic acid, itaconic acid derivatives, fumaric acid or fumaric acid derivatives; and salts thereof.

These resins are alkaline-soluble resins that are soluble in aqueous solution in which a base has been dissolved. Moreover, these resins may also be homopolymers composed of hydrophilic monomers or salts thereof. In addition, water-soluble resins such as polyvinyl alcohol, carboxymethyl cellulose and naphthalene sulfonate-formaldehyde condensation products can also be used. However, the use of an alkaline-soluble resin offers the advantage of enabling the viscosity of the dispersion to be reduced thereby making dispersion easier. The above-mentioned water-soluble resin is preferably used within the range of 0.1% by mass to 5% by mass with respect to the total amount of the recording ink (recording liquid).

A polymer polymerized from a cationic monomer as explained below can be preferably used as a cationic pigment dispersant. Furthermore, the molecular weight of these polymers is preferably 2000 or more.

A cationic monomer used in the present invention is a quaternary compound of the monomers listed below.

Quaternization of the following monomers is carried out by treating in accordance with ordinary methods using methyl chloride, dimethyl sulfate, benzyl chloride or epichlorhydrin and the like. Examples of monomers include N,N-dimethylaminoethylmethacrylate: [$CH_2=C(CH_3)-CONH-CH_2CH_2N(CH_3)_2$], N,N-dimethylaminoethylacrylate: [$CH_2=CH-CONH-CH_2CH_2N(CH_3)_2$], N,N-dimethylaminoacrylamide: [$CH_2=CH-CON(CH_3)_2$], N,N-dimethylaminomethacrylamide: [$CH_2=C(CH_3)-CON(CH_3)_2$], N,N-dimethylaminopropylacrylamide: [$CH_2=CH-CONH-C_3H_6N(CH_3)_2$] and N,N-dimethylaminopropylmethacrylamide: [$CH_2=C(CH_3)-CONH-C_3H_6N(CH_3)_2$].

In addition, the carbon black used in the present invention can be dispersed in an aqueous medium by introducing a graft polymer group on the surface thereof, or directly or indirectly coating a graft polymer on the surface of the carbon black.

Examples of the graft polymer are indicated below.

Namely, examples of the graft polymer include acrylic acid acrylate-acrylonitrile copolymer, vinyl acetate-acrylic acid ester copolymer, acrylic acid-acrylic acid alkyl ester copolymer, styrene-acrylic acid copolymer, styrene-methacrylic acid copolymer, styrene-acrylic acid-acrylic acid alkyl ester copolymer, styrene-methacrylic acid-acrylic acid alkyl ester copolymer, styrene-α-methylstyrene-acrylic acid copolymer, styrene-α-methylstyrene-acrylic acid copolymer-acrylic acid alkyl ester copolymer, styrene-maleic acid copolymer, vinylnaphthalene-maleic acid copolymer, vinyl acetate-ethylene copolymer, vinyl acetate-fatty acid vinyl ethylene copolymer, vinyl acetate-maleic acid ester copolymer, vinyl acetate-crotonic acid copolymer and vinyl acetate-acrylic acid copolymer.

Examples of the water-insoluble vinyl polymer containing the carbon black used in the present invention include, but are not limited to, those having a compositional unit derived from an acrylate containing an arylalkyl group or aryl group, and a compositional unit may also be contained that is derived from a monomer containing a salt-forming group, a styrene-based macromer, a hydrophobic monomer, (meth)acrylonitrile, (meth)acrylates having an alkyl group having 1 to 22 carbon atoms, and preferably 1 to 18 carbon atoms, which may also have a hydroxy group, aromatic ring-containing monomers other than styrene, silicon-based macromers having a polymerizable functional group on a terminal thereof, and alkyl methacrylate-based macromers.

The content of the colorant in the recording ink is preferably 3% by weight to 15% by weight, and more preferably 4% by weight to 10% by weight. In the case the content of the carbon black is less than 3% by weight, image density decreases. In the case the content of the carbon black exceeds 15% by weight, glossiness on glossy media ends up decreasing. The volume average particle diameter of the colorant, e.g. the above-mentioned carbon black, and the above-mentioned surface-treated carbon black, is preferably 40 nm to 100 nm, and more preferably 60 nm to 80 nm. In the case the volume average particle diameter thereof is less than 40 nm, it becomes difficult to ensure dispersion stability and in the case of printing, even if high-definition images are able to be obtained, there is the problem of the occurrence of unevenness that prevents the obtaining of uniform images. In addition, in the case the volume average particle diameter is more than 100 nm, problems occur such as a decrease in discharge stability.

In view of that superior effects are obtained with respect to solubility and prevention of defective ejecting characteristics caused by evaporation of moisture, the water-soluble organic solvent is preferably selected from glycerin, ethylene glycol, diethylene glycol, triethylene glycol, propylene glycol, dipropylene glycol, tripropylene glycol, 2-methyl-1,3-propane diol, 1,3-butane diol, 2,3-butane diol, 1,4-butane diol, 2-methyl-1,3-butane diol, 3-methyl-1,3-butane diol, 1,5-pentanediol, tetraethylene glycol, 1,6-hexanediol, 2-methyl-2,4-pentanediol, polyethylene glycol, 1,2,4-b utanetriol, 1,2,6-hexanetriol, thiodiglycol, 2-pyrrolidone, N-methyl-2-pyrrolidone and N-hydroxyethyl-2-pyrrolidone. However, the water-soluble organic solvent is not limited thereto, provided that it does not impair the object and effects of the present invention. As the water-soluble organic solvent, one of them may be used alone, or two or more of them may be used in combination.

Examples of other water-soluble organic solvents that may be used within a range that does not impair the object or effects of the present invention include polyvalent alcohols such as polyethylene glycol, polypropylene glycol, 1,3-propanediol, glycerol, 1,2,3-butanetriol or petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether or propylene glycol monoethyl ether; polyvalent alcohol aryl ethers such as ethylene glycol monophenyl ether or ethylene glycol monobenzyl ether; nitrogen-containing heterocyclic compounds such as 1,3-dimethylimidazolidinone or ε-caprolactam; amides such as formamide, N-methylformamide, formamide or N,N-dimethylformamide; amines such as monoethanolamine, diethanolamine, triethanolamine, monoethylamine, diethylamine or triethylamine; sulfur-containing compounds such as dimethylsulfoxide, sulfolan or thiodiethanol; and propylene carbonate and ethylene carbonate. One of them may be used alone, or two or more of them may be used in combination, as necessary.

The content of the water-soluble organic solvent in the recording ink is preferably 15% by mass to 40% by mass, and more preferably 20% by mass to 35% by mass. If the content of the water-soluble organic solvent is excessively low, the nozzle may no longer dry resulting in the occurrence of defective droplet discharge, while if the content is excessively high, the viscosity of the recording ink may increase beyond the proper viscosity limit.

Moreover, a diol compound having 7 to 11 carbon atoms can be used for the purpose of improving permeability. If the number of carbon atoms is less than 7, adequate permeability is unable to be obtained, resulting in soiling of the recorded matter during duplex printing or poor pixel filling due to inadequate spreading of the recording ink on the recording medium, and thereby lowering printing quality and image density, while if the number of carbon atoms exceeds 11, there may be a decrease in storage stability.

Examples of the diol compound include 2-ethyl-1,3-hexanediol and 2,2,4-trimethyl-1,3-pentanediol.

The added amount of the diol compound is preferably 0.1% by mass to 20% by mass and more preferably 0.5% by mass to 10% by mass. If the amount of the diol compound added is excessively low, permeation of the recording ink into the paper becomes inferior causing soiling of the rollers as a result of smearing onto the rollers during paper transport, while also preventing accommodation of high-speed printing and duplex printing. On the other hand, if the amount of the diol compound added is excessively high, the diameter of printed dots increases or the width of letters increases resulting in a decrease in image sharpness.

As the surfactant, one of, or two of more of surfactants selected from an anionic surfactant, a cationic surfactant, a nonionic surfactant, an amphoteric surfactant and a fluorine-based surfactants can be used. The nonionic surfactant and fluorine-based surfactant are used particularly preferably.

Examples of the anionic surfactant include alkyl allyls, alkyl naphthalene sulfonates, alkyl phosphates, alkyl sulfates, alkyl sulfonates, alkyl ether sulfates, alkyl sulfosuccinates, alkyl ester sulfates, alkyl benzene sulfonates, alkyl diphenyl ether disulfonates, alkyl aryl ether phosphates, alkyl aryl ether sulfates, alkyl aryl ether ester sulfates, olefin sulfonates, alkane olefin sulfonates, polyoxyethylene alkyl ether phosphates, polyoxyethylene alkyl ether sulfonic acid esters, ether carboxylates, sulfosuccinates, α-sulfo fatty acid esters, fatty acid salts, condensation products of higher fatty acids and amino acids and napthenates.

Examples of the cationic surfactant include alkylamine salts, dialkylamine salts, fatty acid amine salts, benzalkonium salts, quaternary ammonium salts, alkyl pyridinium salts, imidazolinium salts, sulfonium salts and phosphonium salts.

Examples of the nonionic surfactant include acetylene glycol-based surfactants, polyoxyethylene alkyl ethers, polyoxyethylene alkyl phenyl ethers, polyoxyethylene alkyl esters and polyoxyethylene sorbitan fatty acid esters.

Examples of the amphoteric surfactant include imidazoline derivatives such as imidazolinium betaine, dimethyl alkyl lauryl betaines, alkyl glycines and alkyl di(aminoethyl)glycines.

The surfactants represented by structural formulas (I) to (III) below can be preferably used as the fluorine-based surfactant.

(I)

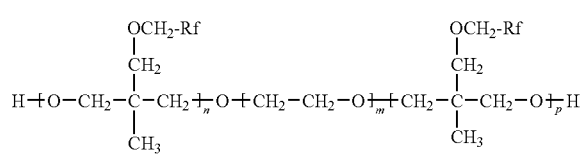

(II)

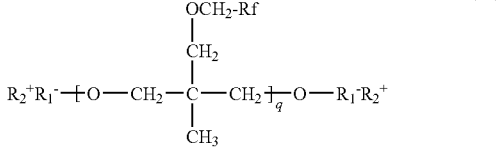

(III)

The above-mentioned resin fine particles are particles resulting from dispersion of a polymer polymerized by radical polymerization, emulsion polymerization, dispersion polymerization, seed polymerization or suspension polymerization and the like in an aqueous medium, and the volume average particle diameter thereof is preferably 10 nm to 300 nm, and more preferably 50 nm to 200 nm.

Examples of the resin used for the resin particles include acrylic, methacrylic, styrene, urethane, acrylamide, polyester and butadiene resins, a mixture thereof, and a copolymer thereof. In addition, a silicone-modified resin modified by using a silane compound can also be used. More preferably, a silicone-modified acrylic resin obtained by polymerizing an acrylic monomer and a silane compound in the presence of an emulsifier is used, and the resin is preferably free of hydrolytic silyl groups. The silyl groups are hydrolyzed to silanol groups, and the silanol groups condense by dehydration to form a siloxane bond. Since the bonding energy of siloxane bonds in silicone resins is high, a coated film containing siloxane bonds has superior rubfastness and solvent resistance. Furthermore, if the above-mentioned hydrolytic silyl groups remain, storageability may be poor as a recording ink. In addition, since a silicon-modified acrylic resin has superior heat stability, there is no occurrence of cogation and a stable discharge can be achieved in the case of adopting a means for ejecting ink by applying thermal energy.

The added amount of the resin fine particles to the pigment is preferably 0.05 parts by mass to 1.2 parts by mass, and more preferably 0.2 parts by mass to 1.0 part by mass, with respect to 1 part by mass of the pigment. If the amount of resin added is less than 0.05 parts by mass, adequate fixation is unable to be obtained, while if the amount of resin exceeds 1.2 parts by mass, the storage stability may be exacerbated and discharge characteristics may decrease.

If the mass ratio of carbon black to resin fine particles in the recording ink, i.e., the ratio of the amount (A) of carbon black to the amount (B) of resin fine particles in the recording ink is less than 1/0.05, it may result in poor fixability. If the ratio (A)/(B) is greater than 1/1.2, it may result in poor storage stability and/or poor discharge stability.

Although other components can be suitably selected as necessary without any particular limitations thereon, examples include a pH adjuster, an antifungal and anti-mold agent, a rust-proofing agent, an antioxidant, an ultraviolet absorber, an oxygen absorber and a photostabilizer.

There are no particular limitations on the pH adjuster provided that it is able to adjust the pH to 7 or higher without having a detrimental effect on the formulated ink, and any arbitrary substance can be used according to the purpose of use.

Examples of the pH adjuster include amines such as diethanolamine or triethanolamine, hydroxides of alkaline metal elements such as lithium hydroxide, sodium hydroxide or potassium hydroxide; ammonium hydroxide, quaternary ammonium hydroxides, quaternary phosphonium hydroxides and carbonates of alkaline metals such as lithium carbonate, sodium carbonate and potassium carbonate.

Examples of the antifungal and anti-mold agent include 1,2-benzisothiazolin-3-one, sodium dehydroacetate, sodium sorbate, sodium 2-pyridinethiol-1-oxide, sodium benzoate and sodium pentachlorophenol.

Examples of the rust preventive include acidic sulfites, sodium thiosulfate, ammonium thioglycolate, diisopropyl ammonium nitrite, pentaerythritol tetranitrate and dicyclohexylammonium nitrite.

Examples of the antioxidant include phenol-based antioxidants (including hindered phenol-based antioxidants), amine-based antioxidants, sulfur-based antioxidants and phosphorous-based antioxidants.

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers and nickel complex salt-based ultraviolet absorbers.

There are no particular limitations on the physical properties of the recording ink of the present invention, and can be suitably selected according to the purpose of use, with properties such as solid content, viscosity, surface tension and pH preferably being within the ranges indicated below.

The solid content of the recording ink is preferably 5% by mass to 30% by mass, and more preferably 6% by mass to 15% by mass. If the solid content is less than 5% by mass, it may not be possible to obtain adequate image density after printing.

In the present invention, the solid content of the ink mainly refers to the content of the water-insoluble colorant and the resin fine particles.

The viscosity of the ink is preferably 5 mPa·s to 20 mPa·s, and more preferably 5 mPa·s to 10 mPa·s at 25° C. If the viscosity at 25° C. exceeds 20 mPa·s, it may be difficult to ensure discharge stability.

The surface tension is preferably 25 mN/m to 55 mN/m at 20° C. If the surface tension is less than 25 mN/m at 20° C., bleeding on the recording article may become prominent and it may not be possible to obtain stable ejecting, while if the surface tension exceeds 55 mN/m, there is inadequate penetration of ink into the recording medium thereby leading to prolonged drying time.

The pH is preferably, for example, 7 to 10.

The recording ink of the present invention can be preferably used in various fields, can be preferably used in an image recording device (such as a printer) using an inkjet recording system, can be used in a printer, for example, having a function that heats a recorded paper and the recording ink to 50° C. to 200° C. during printing or before or after printing to promote printing fixation, and can be particularly preferably used in an ink cartridge, ink recorded matter, inkjet recording apparatus and inkjet recording method of the present invention as indicated below.

(Recording Medium)

The recording medium contains a substrate and a coated layer on at least one side of the substrate, and may contain another layer as necessary.

In the recording medium, the amount of the ink of the present invention transferred to the recording medium at a contact time of 100 ms as measured with a dynamic scanning absorptometer is 2 ml/m$^2$ to 40 ml/m$^2$ and preferably 3 ml/m$^2$ to 30 ml/m$^2$. In addition, the amount of pure water transferred to the recording medium is preferably 2 ml/m$^2$ to 35 ml/m$^2$ and more preferably 3 ml/m$^2$ to 30 ml/m$^2$.

If the amount of the ink and pure water transferred to the recording medium at the contact time of 100 ms is excessively low, beading tends to occur easily, while if the transferred amount is excessively high, the diameter of ink dots after recording tends to be smaller than a desired diameter.

The amount of the ink of the present invention transferred to the recording medium at a contact time of 400 ms as measured with a dynamic scanning absorptometer is 3 ml/m$^2$ to 50 ml/m$^2$ and preferably 4 ml/m$^2$ to 40 ml/m$^2$. In addition, the amount of pure water transferred to the recording medium is 3 ml/m$^2$ to 40 ml/m$^2$ and preferably 4 ml/m$^2$ to 35 ml/m$^2$.

If the amount transferred at the contact time of 400 ms is excessively low, spur marks occur easily due to inadequate drying, while if the amount transferred is excessively high, bleeding occurs easily and the glossiness of images after drying decreases easily.

Here, the dynamic scanning absorptometer (DSA, Japan TAPPI Journal, Vol. 48, May 1994, p. 88-92, Shigenori Kuga) is an apparatus capable of accurately measuring liquid absorption in an extremely short period of time. The dynamic scanning absorptometer described above performs measurements automatically using a procedure containing reading the rate of liquid absorption directly from the movement of the meniscus in a capillary tube, using a sample in the shape of a disk, scanning the liquid absorption head thereon moving in the shape of a spiral, automatically changing the scanning rate according to a preset pattern, and measuring only the required number of points with a single sample. The liquid supply head for supplying a liquid to a paper sample is connected to a capillary tube via a Teflon (registered trademark) tube, and the position of the meniscus within the capillary tube is read automatically with an optical sensor. More specifically, the amount of transfer of pure water or ink is measured using a dynamic scanning absorptometer (Model K350 Series D, Kyowa Seiko Co., Ltd.). The transferred amounts at contact times of 100 ms and 400 ms can be determined by interpolating from a measured value of transferred amount at a contact time approximating each contact time. The measurement is carried out at 23° C. and 50% RH.

(Substrate)

There are no particular limitations on the substrate, and can be suitably selected according to the purpose of use. Examples of the substrate include sheet-form materials such as paper consisting mainly of wood fibers and non-woven fabric consisting mainly of wood fibers and synthetic fibers.

There are no particular limitations on the paper, the paper can be suitably selected from known paper according to the purpose of use, and examples thereof include wood pulp and recycled pulp. Examples of the wood pulp include leaf bleached kraft pulp (LBKP), needle bleached kraft pulp (NBKP), NBSP, LBSP, GP and TMP.

Raw materials of the recycled pulp are indicated in the list of recycled paper standard quality specifications of the Paper Recycling Promotion Center, examples of which include hard white shaving, lined paper, cream white paper, white card, special white woody shavings, intermediate white woody shavings, fine printed paper, white coated paper, kent paper, white art paper, special top cuttings, separate top cuttings, newspapers and magazines. Specific examples include recycled paper and paperboard including printer paper such as information-related paper including non-coated computer paper, thermosensitive paper and pressure-sensitive paper; OA recycled paper such as PPC paper; coated paper such as art paper, coated paper, lightly coated paper and matte paper; and, non-coated paper such as wood-free paper, colored wood-free paper, notebook paper, stationery, packaging paper, fancy paper, medium quality paper, newsprint, ground wood paper, super wrapping paper, simili paper, pure white roll paper and milk cartons, as well as chemical pulp paper and high yield pulp-containing paper. One type of this paper may be used or two or more types may be used in combination.

The recycled pulp is typically produced from a combination of the four steps indicated below:
(1) disintegration, in which recycled paper is treated with mechanical force and chemicals using a pulper to break up into fibers followed by separation of printing ink from the fibers;
(2) dedusting, in which foreign objects (such as plastic) and debris contained in the recycled paper are removed with a screen, cleaner and the like;
(3) deinking, in which separated printing ink is removed from the fibers using a surfactant to outside the system by a flotation method or cleaning method; and
(4) bleaching, in which the whiteness of the fibers is enhanced using oxidative or reducing action.

In the case of mixing the above-mentioned pulp, the mixing ratio of recycled pulp to the total amount of pulp is preferably 40% or less on the basis of measures to prevent curling after recording.

A pigment conventionally known as a white pigment, for example, is used as an internally added filler used in the substrate. Examples of the white pigment include: white inorganic pigments such as light calcium carbonate, heavy calcium carbonate, kaolin, clay, talc, calcium sulfate, barium sulfate, titanium dioxide, zinc oxide, zinc sulfate, zinc carbonate, satin white, aluminum silicate, diatomaceous earth, calcium silicate, magnesium silicate, synthetic silica, aluminum hydroxide, alumina, lithopone, zeolite, magnesium carbonate or magnesium hydroxide; and organic pigments such as styrene-based plastic pigments, acrylic plastic pigments, polyethylene, microcapsules, urea resin or melamine resin. One of these pigments may be used alone or two or more of them may be used in combination.

As an internally added sizing agent used in the process of producing the substrate, a neutral rosin-based sizing agent used for neutral paper production, alkenyl succinic anhydride (ASA), alkyl ketene dimer (AKD) or a petroleum resin-based sizing agent is used. Among these, the neutral rosin-based sizing agent or alkenyl succinic anhydride is particularly preferable. Although the alkyl ketene dimer only requires a small amount to be added due to its high sizing effects, it causes a decrease in the coefficient of friction of the surface of the recording paper (media) making the surface of the paper excessively slippery, and there are cases in which it is undesirable from the viewpoint of ease of transport during the inkjet recording.

(Coating Layer)

The above-mentioned coating layer contains a pigment and a binder, as well as a surfactant and other components as necessary.

An inorganic pigment or a combination of an inorganic pigment and an organic pigment can be used as the pigment.

Examples of the inorganic pigment include kaolin, talc, calcium bicarbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorite. Among these, kaolin is particularly preferable due to its superior glossability and ability to yield a texture that approaches that of paper for offset printing.

Although examples of the kaolin include delaminated kaolin, calcined kaolin and surface-modified and other types of engineered kaolin, in consideration of glossability, kaolin having a particle size distribution in which 80% by mass or more of the particles have a particle diameter of 2 μm or less preferably accounts for 50% or more of all kaolin present.

The added amount of the kaolin is preferably 50 parts by mass or more with respect to 100 parts of the total amount of the pigment in the coating layer. If the amount of kaolin is less than 50 parts by mass, adequate effects are unable to be obtained with respect to glossiness.

Although there are no particular limitations on the upper limit of the amount of the kaolin, in consideration of the fluidity of the kaolin, and particularly increases in viscosity in the presence of high shearing force, the amount of kaolin added is preferably 90 parts by mass or less from the viewpoint of coating aptitude.

Examples of the organic pigment include water-soluble dispersions of, for example, styrene-acrylic copolymer particles, styrene-butadiene copolymer particles, polystyrene particles or polyethylene particles. Two or more of these organic pigments may be used in combination.

The added amount of the organic pigment is preferably 2 parts by mass to 20 parts by weight with respect to 100 parts by mass of the total amount of the pigment in the coating layer. Since the organic pigment has superior glossability and the specific gravity thereof is small in comparison with inorganic pigment, it allows the obtaining of a coating layer having high bulk, high gloss and satisfactory surface coatability. If the amount of the organic pigment added is less than 2 parts by mass, the effects described above are not obtained, while if the amount added exceeds 20 parts by mass, the fluidity of the coating liquid becomes poor leading to a decrease in coating workability, while also not being economical in terms of cost.

Although examples of the forms of the organic pigment include solid types, hollow types and doughnut-shaped types, in consideration of the balance among glossability, surface coatability and coating liquid fluidity, a hollow type is used preferably having an average particle diameter of 0.2 μm to 3.0 μm and more preferably porosity of 40% or more.

An aqueous resin is preferably used for the binder.

At least a water-soluble resin and water-dispersible resin are preferably used for the aqueous resin. There are no particular limitations on the water-soluble resin, the water-soluble resin can be suitably selected according to the purpose of use, and examples thereof include polyvinyl alcohol and polyvinyl alcohol modification products such as anion-modified polyvinyl alcohol, cation-modified polyvinyl alcohol or acetal-modified polyvinyl alcohol; polyurethane; polyvinyl pyrrolidone and polyvinyl pyrrolidone modification products such as copolymers of polyvinyl pyrrolidone and vinyl acetate, copolymers of vinyl pyrrolidone and dimethylaminoethyl methacrylate, copolymers of quaternized vinyl pyrrolidone and dimethylaminoethyl methacrylate or copolymers of vinyl pyrrolidone and methacrylamide propyl trimethyl ammonium chloride; celluloses such as carboxymethyl cellulose, hydroxyethyl cellulose or hydroxypropyl cellulose; cellulose modification products such as cationated hydroxyethyl cellulose; synthetic resins such as polyester, polyacrylic acid (ester), melamine resin or modification products thereof or copolymers of polyester and polyurethane; and poly(meth)acrylic acid, poly(meth)acrylamide, oxidized starch, phosphoric acid-esterified starch, self-modifying starch, cationated starch, various types of modified starch, polyethylene oxide, sodium polyacrylate and sodium arginate. One of these water-soluble resins may be used alone or two or more of them may be used in combination.

Among these water-soluble resins, polyvinyl alcohol, cation-modified polyvinyl alcohol, acetal-modified polyvinyl alcohol, polyester, polyurethane and copolymers of polyester and polyurethane are particularly preferable from the viewpoint of ink absorption.

There are no particular limitations on the water-dispersible resin, a water-dispersible resin can be suitably selected according to the purpose of use, and examples thereof include polyvinyl acetate, ethylene-vinyl acetate copolymers, polystyrene, styrene-(meth)acrylic acid ester copolymers, (meth) acrylic acid ester copolymers, vinyl acetate-(meth)acrylic acid (ester) copolymers, styrene-butadiene copolymers, ethylene-propylene copolymers, polyvinyl ether and siliconeacrylic copolymers. In addition, a crosslinking agent such as methylolated melamine, methylolated urea, methylolated hydroxypropylene urea or isocyanate may also be contained, and the water-dispersible resin may self-crosslink with a copolymer containing a unit such as N-methylolacrylamide. A plurality of these aqueous resins can also be used simultaneously.

The added amount of the aqueous resin is preferably 2 parts by mass to 100 parts by mass and more preferably 3 parts by mass to 50 parts by mass with respect to 100 parts by mass of the pigment. The amount of the aqueous resin is determined so that the liquid absorption properties of the recording media are within a desired range.

Although a cationic organic compound is not necessarily required to be incorporated in the case of using a water-dispersible colorant for the colorant, there are no particular limitations thereon, and a cationic organic compound can be suitably selected and used according to the purpose of use, examples of which include primary to tertiary amines that form an insoluble salt by reacting with sulfonic acid groups, carboxyl groups or amino groups and the like in a direct dye or acidic dye present in the water-soluble ink, and a monomer, oligomer, or polymer of a quaternary ammonium salt, with oligomers or polymers being particularly preferable.

Examples of the cationic organic compound include dimethylamine-epichlorhydrin polycondensation products, dimethylamine-ammonia-epichlorhydrin condensation products, poly(trimethylaminoethyl methacrylate-methyl sulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensation product, polyalkylene polyamine-dicyandiamide ammonium salt condensation product, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivative), acrylamide-diallyldimethylammonium chloride copolymer, acrylate-acrylamide-diallylamine hydrochloride copolymer, ethylene imine derivatives such as polyethylene imine or acrylamine polymer, and polyethylene amine alkylene oxide modification products. One of these cationic organic compounds may be used alone or two or more of them may be used in combination.

Among these, combinations of low molecular weight cationic organic compounds such as dimethylamine-epichlorhydrin polycondensation products or polyallylamine hydrochloride and other comparatively high molecular weight cationic organic compounds such as poly(diallyldimethylammonium chloride) are used particularly preferably. The combined use of these cationic organic compounds improves image density and further decreases feathering as compared with the case of using alone.

The cation equivalent of the cationic organic compound as determined by colloidal titration (using potassium polyvinyl sulfate and toluidine blue) is preferably 3 meq/g to 8 meq/g. Favorable results are obtained within the above-mentioned range of the dry-based deposition amount if the cation equivalent is within this range.

Here, in measuring the cation equivalent using colloidal titration as described above, the cationic organic compound is diluted with distilled water to a solid content of 0.1% by mass without adjusting the pH.

The deposition amount of the cationic organic compound is preferably 0.3 $g/m^2$ to 2.0 $g/m^2$ on dry basis. If the deposition amount of the cationic organic compound is less than 0.3 $g/m^2$, adequate image density improving effects and feathering reduction effects are not obtained.

There are no particular limitations on the surfactant, the surfactant can be suitably selected according to the purpose of use, and examples of the surfactant for use include an anionic surfactant, a cationic surfactant, an amphoteric surfactant and a nonionic surfactant. Among these, the nonionic surfactant is particularly preferable. Addition of the surfactant improves image waterfastness while also increasing image density and improving bleeding.

Examples of the nonionic surfactant include higher alcohol ethylene oxide addition products, alkyl phenol ethylene oxide addition products, fatty acid ethylene oxide addition products, polyvalent alcohol fatty acid ester ethylene oxide addition products, higher fatty acid amine ethylene oxide addition products, fatty acid amide ethylene oxide addition products, oil ethylene oxide addition products, polypropylene glycol ethylene oxide addition products, glycerol fatty acid esters, pentaerythritol fatty acid esters, sorbitol and sorbitan fatty acid esters, sucrose fatty acid esters, polyvalent alcohol alkyl ethers and alkanoyl amine fatty acid amides. One of these nonionic surfactants may be used alone or two or more of them may be used in combination.

There are no particular limitations on the polyvalent alcohol, the polyvalent alcohol can be suitably selected according to the purpose of use, and examples thereof include glycerol, trimethylolpropane, pentaerythritol, sorbitol and sucrose. In addition, ethylene oxide addition products are effective if a portion of the ethylene oxide is substituted with an alkylene oxide such as propylene oxide or butylene oxide. The substitution rate is preferably 50% or less. The hydrophilic lipophilic balance (HLB) of the nonionic surfactant is preferably 4 to 15 and more preferably 7 to 13.

The amount of the surfactant added is preferably 0 to 10 parts by mass, and more preferably 0.1 parts by mass to 1.0 part by mass with respect to 100 parts by mass of the cationic organic compound.

Other components can be further added as necessary to the coating layer within a range that does not impair the object and effects of the present invention. Examples of these other components include additives such as alumina powder, a pH adjuster, an antiseptic and an antioxidant.

There are no particular limitations on the method used to form the coating layer, the method can be suitably selected according to the purpose of use, and the coating layer can be formed by a method by which the coating layer liquid is impregnated or coated onto the substrate. There are no particular limitations on the method for impregnating or coating the coating layer liquid, the method can be suitably selected according to the purpose of use, and the coating liquid layer can be impregnated or coated using various types of coating machines such as a conventional size press, gate roll size press, film transfer size press, blade coater, rod coater, air knife coater or curtain coater. Among these, a preferred method in terms of cost contains impregnating or applying the coating layer liquid with a conventional size press, gate roll size press or film transfer size press and the like installed on a papermaking machine followed by on-machine finishing.

There are no particular limitations on the deposition amount of the coating layer liquid, and although the deposition amount can be suitably selected according to the purpose of use, it is preferably 0.5 g/m$^2$ to 20 g/m$^2$ and more preferably 1 g/m$^2$ to 15 g/m$^2$ on solid basis. If the deposition amount is less than 0.5 g/m$^2$, ink ends up running over resulting in bleeding since the ink cannot be adequately absorbed. Conversely, if the deposition amount exceeds 20 g/m$^2$, the texture of the paper is impaired resulting in problems such as the paper being difficult to bend and it being difficult to write on with a writing instrument.

Drying may be carried out following the impregnation or coating, there are no particular limitations on the drying temperature in this case, and although the drying temperature can be suitably selected according to the purpose of use, it is preferably about 100° C. to 250° C.

The recording media may further have a back layer formed on the back of the substrate, or another layer formed between the substrate and the coating layer or between the substrate and the back layer, and a protective layer can also be provided on the coating layer. Each of these layers may be in the form of a single layer or a plurality of layers.

The recording medium for use in the present invention may also be selected from commercially available coated paper for offset printing or coated paper for gravure printing and the like, in addition to the inkjet recording medium of the present invention, provided that the liquid absorption properties thereof are within the scope of the present invention.

The basis weight of the recording medium of the present invention is preferably 50 g/m$^2$ to 250 g/m$^2$. If the basis weight is less than 50 g/m$^2$, problems occur easily during transport such as the recording medium becoming jammed at an intermediate location along the transport path due to a lack of stiffness. If the basis weight exceeds 250 g/m$^2$, problems again occur easily during transport such as the recording medium becoming jammed as a result of being unable to bend adequately at corners present at intermediate locations along the transport path due to excessive stiffness.

(Ink Cartridge)

An ink cartridge for use in the present invention houses the recording ink of the present invention in a container, and further contains other suitably selected members and the like as necessary.

There are no particular limitations on the container, the shape, structure, size, material and the like thereof can be suitably selected according to the purpose of use, and preferable examples thereof include containers at least having an ink pouch and the like formed from an aluminum laminated film or resin film and the like.

Figure 2:
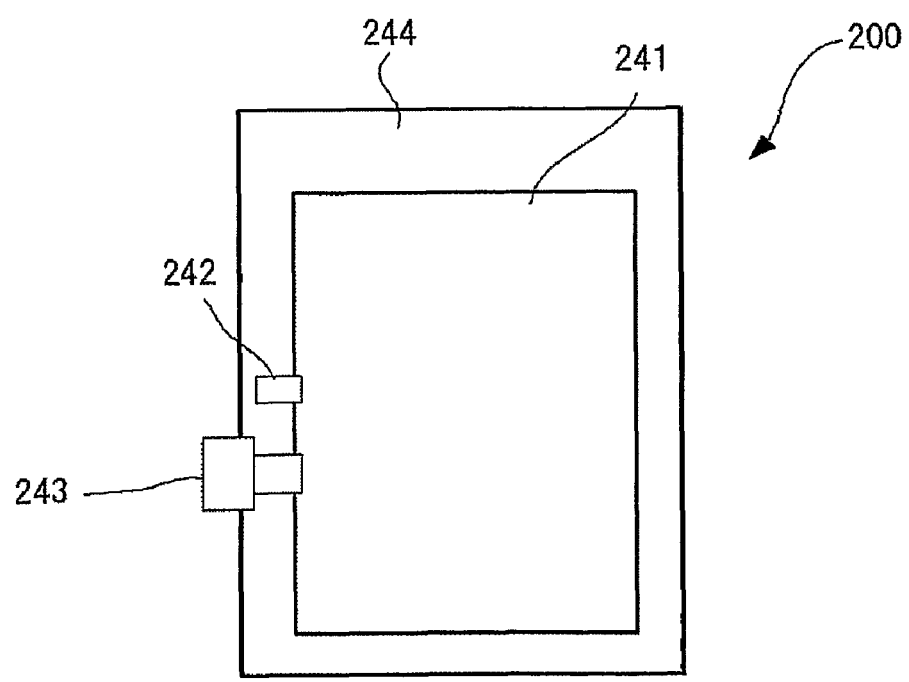
FIG. 2 is a schematic drawing that includes a case (casing) for the ink cartridge of FIG. 1.

The following provides an explanation of the ink cartridge with reference to FIGS. 1 and 2. Here, FIG. 1 is a drawing showing an example of an ink cartridge for use in the present invention, while FIG. 2 is a drawing that includes a case (casing) for the ink cartridge of FIG. 1.

As shown in FIG. 1, in an ink cartridge (200), an ink is filled into an ink pouch (241) from an ink injection port (242), and after evacuating air from inside the ink pouch (241), the ink injection port (242) is sealed by melting. At the time of use, a needle of an apparatus body is inserted into a discharge outlet (243) made of a rubber member to supply ink to the apparatus.

The ink pouch (241) is formed from a packaging member such as an air-impermeable aluminum laminated film. As shown in FIG. 2, this ink pouch (241) is normally contained inside a plastic cartridge case (244), enabling it to be used by removably installing in various types of inkjet recording apparatuses.

The ink cartridge for use in the present invention houses the recording ink (ink set) of the present invention, can be used by removably installing in various types of inkjet recording apparatuses, and is particularly preferably used by removably installing in the inkjet recording apparatus of the present invention to be described hereinafter.

(Inkjet Recording Apparatus and Inkjet Recording Method)

The inkjet recording apparatus of the present invention contains at least an ink ejecting unit, and may also have other suitably selected units, such as a stimulus generation unit or control unit, as necessary.

The inkjet recording method of the present invention contains at least an ink ejecting step, and may also contain other suitably selected steps, such as a stimulus generating step or control step, as necessary.

The inkjet recording method of the present invention can be preferably carried out by the inkjet recording apparatus of the present invention, and the ink ejecting step can be preferably carried out by the ink ejecting unit. In addition, the other steps can be preferably carried out by the other units, respectively.

(Ink Ejecting Step and Ink Ejecting Unit)

The ink ejecting step is a step in which a stimulus is applied to the recording ink of the present invention so as to eject the recording ink to thereby record an image.

The ink ejecting unit is a unit whereby a stimulus is applied to the recording ink of the present invention so as to eject the recording ink to thereby record an image. There are no particular limitations on the ink ejecting unit, and examples thereof include various types of nozzles for discharging ink.

In the present invention, at least a portion of a liquid chamber, fluid resistance unit, vibrating plate and nozzle member of the inkjet head are preferably formed from a material at least containing silicon and nickel.

In addition, the diameter of the inkjet nozzle is preferably 30 μm or less, and more preferably 1 μm to 20 μm.

In addition, the inkjet head is preferably composed such that a subtank for supplying ink is provided on the inkjet head, and ink is replenished into the subtank from the ink cartridge through a supply tube.

The stimulus can be generated by, for example, the stimulus generation unit, there are no particular limitations on the stimulus, the stimulus can be suitably selected according to the purpose of use, and examples thereof include heat (temperature), pressure, vibration and light. One of these stimuli may be used alone or two or more of them may be used in combination. Heat and pressure are preferable examples of the stimuli.

Furthermore, examples of the stimulus generation unit include a heating apparatus, pressurization apparatus, piezoelectric device, vibration generator, ultrasonic wave generator and a light. Specific examples include a piezoelectric actuator such as a piezoelectric device, a thermal actuator utilizing a phase change resulting from film boiling of a liquid using a thermoelectric conversion device such as an exothermic resistor, a shape memory alloy actuator using a metal phase change resulting from a change in temperature, and an electrostatic actuator using electrostatic force.

There are no particular limitations on the aspect of the recording ink, and may differ corresponding to, for example, the type of the stimulus. For example, in the case the stimulus is "heat", an example of a method consists of imparting thermal energy corresponding to a recording signal to the recording ink inside the recording head using, for example, a thermal head, causing bubbles to be formed in the recording ink by the thermal energy, and causing the recording ink to be discharged and ejected in the form of droplets from a nozzle orifice of the recording head due to the pressure of the bubbles. In addition, in the case the stimulus is "pressure", an example of a method consists of applying a voltage to a piezoelectric device adhered at a location referred to as a pressure chamber located in an ink channel inside the recording head, this voltage causing deflection of the piezoelectric device, and then discharging and ejecting the recording ink in the form of droplets from a nozzle orifice of the recording head due to the resulting reduction in volume of the pressure chamber.

The size of the ejected recording ink droplets is preferably, for example, 3 pL to 40 pL, the discharge ejecting speed thereof is preferably 5 m/s to 20 m/s, the driving frequency thereof is preferably 1 kHz or more, and the resolution thereof is preferably 300 dpi or more.

If the ink deposition amount is less than 1.5 $g/m^2$, it may result in failure to obtain sufficient image density. If the ink deposition amount is greater than 15 $g/m^2$, it may result in failure to obtain sufficient fixability.

An inversion unit that enables duplex printing by inverting the recording surface of a recording medium is preferably provided. Examples of the inversion unit include a conveyor belt having electrostatic force, a unit that holds the recording medium by air suction, and a combination of a transport roller and a spur.

The inkjet recording apparatus preferably contains an endless conveyor belt and a conveying unit which is configured to charge the surface of the conveyor belt so as to conveys a recording medium while holding the recording medium on the surface of the conveyor belt. In this case, the conveyor belt is particularly preferably charged by applying an AC bias voltage of ±1.2 kV to ±2.6 kV to a charging roller.

Furthermore, there are no particular limitations on the control unit provided that it is able to control the operation of each of the units, the control unit can be suitably selected according to the purpose of use, and examples thereof include equipment such as a sequencer or a computer.

The following provides an explanation of an aspect for carrying out the inkjet recording method of the present invention with the inkjet recording apparatus of the present invention with reference to the drawings. The inkjet recording apparatus shown in FIG. 3 has an apparatus body (101), a feed tray (102) for feeding paper installed in the apparatus body (101), an output tray (103) for accumulating paper on which images have been recorded (formed) installed in the apparatus body (101), and an ink cartridge loading unit (104). A control unit (105) consisting of operating keys, indicators and the like is arranged on the upper surface of the ink cartridge loading unit (104). The ink cartridge loading unit (104) has an opening and closing front cover (115) for installing and removing an ink cartridge (200). Furthermore, in FIG. 3, reference symbol 105 indicates a control unit, reference symbol 111 indicates a top cover and reference symbol 112 indicates a front panel.

Figure 4:
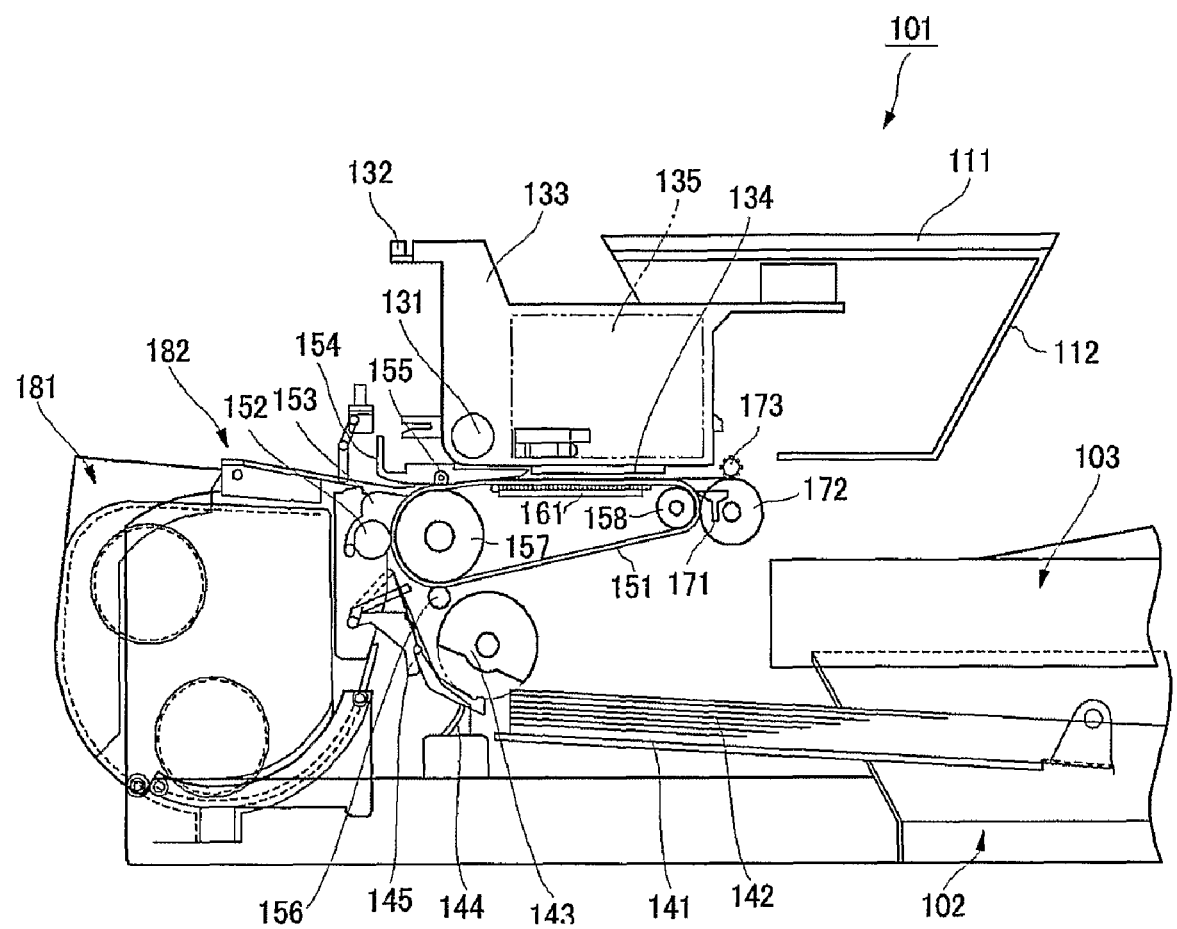
FIG. 4 is a schematic block drawing for explaining an overall configuration of an inkjet recording apparatus.
Figure 5:
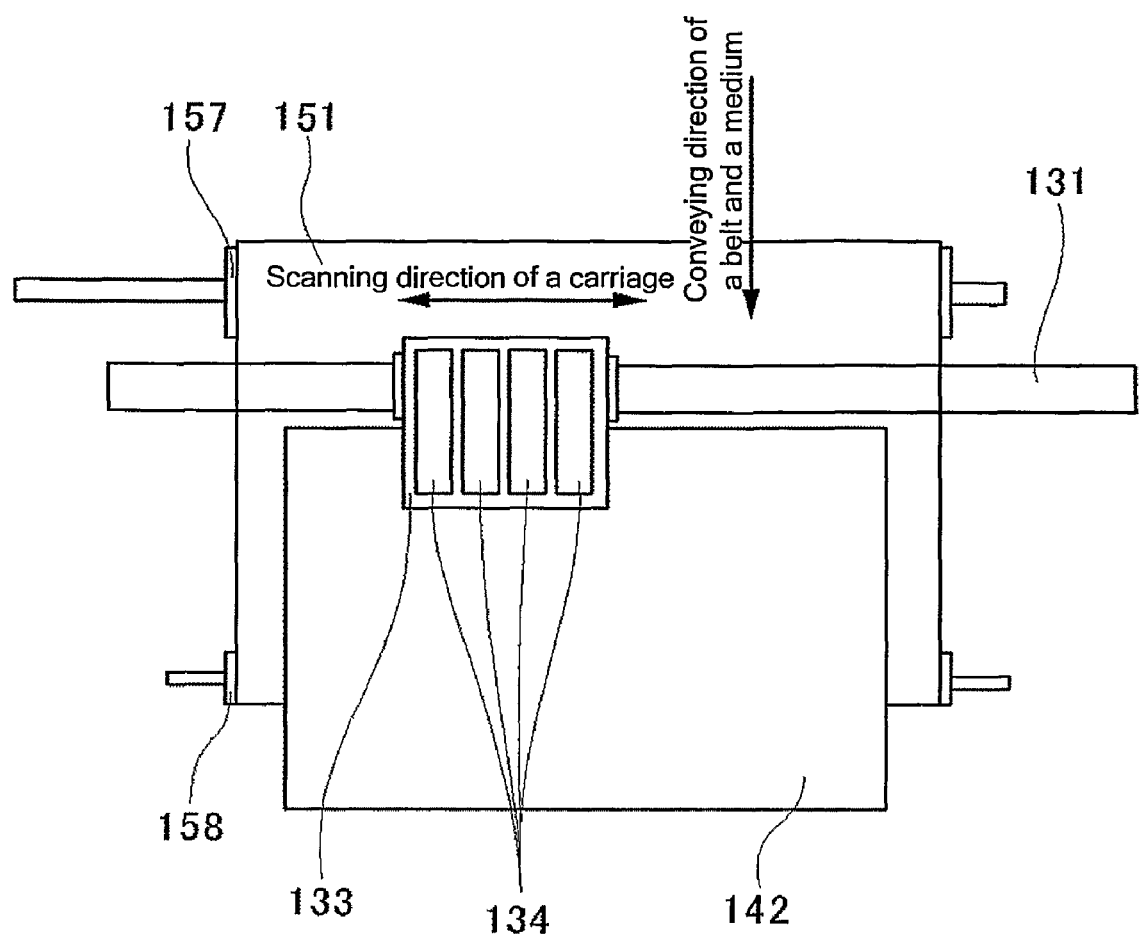
FIG. 5 is a schematic enlarged view showing an example of an inkjet head for use in the present invention.

As shown in FIGS. 4 and 5, a carriage (133) is slidably retained in a main scanning direction by a guide member in the form of a guide rod (131), horizontally suspended on left and right side plates not shown, and a stay (132) within the apparatus body (101), and moves and scans in the direction indicated by the arrows in FIG. 5 by a main scanning motor (not shown).

In the carriage (133), a recording head (134), composed of four inkjet recording heads discharging recording ink droplets of each of the colors of yellow (Y), cyan (C), magenta (M) and black (Bk), is arranged in a direction in which a plurality of ink discharge ports intersect with the main scanning direction, and is installed with the direction of ink droplet discharge facing downward.

An inkjet recording head can be used for the inkjet recording heads composing the recording head (134) that is provided with an energy generation unit for discharging the recording ink, examples of which include a piezoelectric actuator such as a piezoelectric device, a thermal actuator utilizing a phase change resulting from film boiling of a liquid using a thermoelectric conversion device such as an exothermic resistor, a shape memory alloy actuator using a metal phase change resulting from a change in temperature, and an electrostatic actuator using electrostatic force.

In addition, subtanks (135) corresponding to each color are loaded on the carriage (133) for supplying each color of ink to the recording head (134). The subtanks (135) are replenished with ink as a result of the recording ink of the present invention being supplied from the ink cartridge (200) of the present invention loaded in the ink cartridge loading unit (104) via recording ink supply tubes not shown.

On the other hand, a paper feed unit for feeding paper (142) loaded on a paper loading unit (pressure plate) (141) of the feed tray (102) is provided with a semilunar roller (paper feed roller 143) that separates and feeds the paper (142) from the paper loading unit (141) one sheet at a time, and a separation pad (144) in opposition to the paper feed roller (143) and composed of a material having a large coefficient of friction, and this separation pad (144) applies force to the side of the paper feed roller (143).

A transport unit for transporting the paper (142) fed from the paper feed unit beneath the recording head (134) is provided with a conveyor belt (151) for transporting the paper (142) by electrostatic adsorption, a counter roller (152) for transporting the paper (142) fed from the paper feed unit via a guide (145) by interposing between the counter roller (152) and the conveyor belt (151), a transport guide (153) for deflecting the paper (142) fed in a roughly vertical direction onto the conveyor belt (151) by changing the direction thereof by about 90°, and a leading end pressing roller (155) that is pressed against the conveyor belt (151) with a clamping member (154). In addition, a charging unit in the form of a charging roller (156) is provided for charging the surface of the conveyor belt (151).

The conveyor belt (151) is an endless belt, is suspended between a transport roller (157) and a tension roller (158), and is able to revolve in the direction of belt transport. This conveyor belt (151) has a surface layer serving as a paper adsorbing surface formed with a resin material for which resistance has not been controlled and which has a thickness of about 40 μm, such as an ethylene-tetrafluoroethylene (ETFE) copolymer, and a back layer (intermediate resistance layer, ground layer) made of the same material as the surface layer but for which resistance has been controlled with carbon. A guide member (161) corresponding to the area printed by the printing head (134) is arranged on the back side of the conveyor belt (151). Furthermore, an output unit for discharging paper (142) recorded with the printing head (134) is provided with a separating finger (171) for separating the paper (142) from the conveyor belt (151), a discharge roller (172) and a discharge roller (173), and the output tray (103) is arranged beneath the discharge roller (172).

A duplex feed unit (181) is removably installed on the rear panel of the apparatus body (101). The duplex feed unit (181) takes in and inverts paper (142) returned by rotation of the conveyor belt (151) in the opposite direction and then re-feeds the paper (142) between the counter roller (152) and the conveyor belt (151). Furthermore, a manual feed unit (182) is provided on the upper surface of the duplex feed unit (181).

A recording operation is completed and paper (142) is discharged into the output tray (103) by the receiving of a recording completion signal or a signal that the trailing edge of the paper (142) has reached the recording area.

When the amount of recording ink remaining in a subtank (135) is detected as being nearly empty, a required amount of recording ink is replenished into the subtank (135) from the ink cartridge (200).

In this inkjet recording apparatus, when all of the ink in the ink cartridge (200) of the present invention has been used up, only the ink contained in the ink cartridge (200) can be replaced by disassembling the housing of the ink cartridge (200). In addition, the ink cartridge (200) is able to stably supply ink even if a front-loading configuration is employed while placed upright. Thus, even if the apparatus body (101) is installed with the top thereof blocked, such as in the case of housing in a rack or placing an object on the upper surface of the apparatus body (101), the ink cartridge (200) can be easily replaced.

Furthermore, although the explanation here has used the example of applying to a serial type (shuttle type) inkjet recording apparatus in which the carriage performs scanning, the present invention can also be similarly applied to a line type inkjet recording apparatus provided with a line type head.

In addition, the inkjet recording apparatus and inkjet recording method of the present invention can be applied to various types of recording using an inkjet recording system, and can be particularly preferably applied to, for example, an inkjet recording printer, a facsimile machine, a photocopier or a combination printer, facsimile machine and photocopier.

The following describes an inkjet head to which the present invention is applied.

Figure 6:
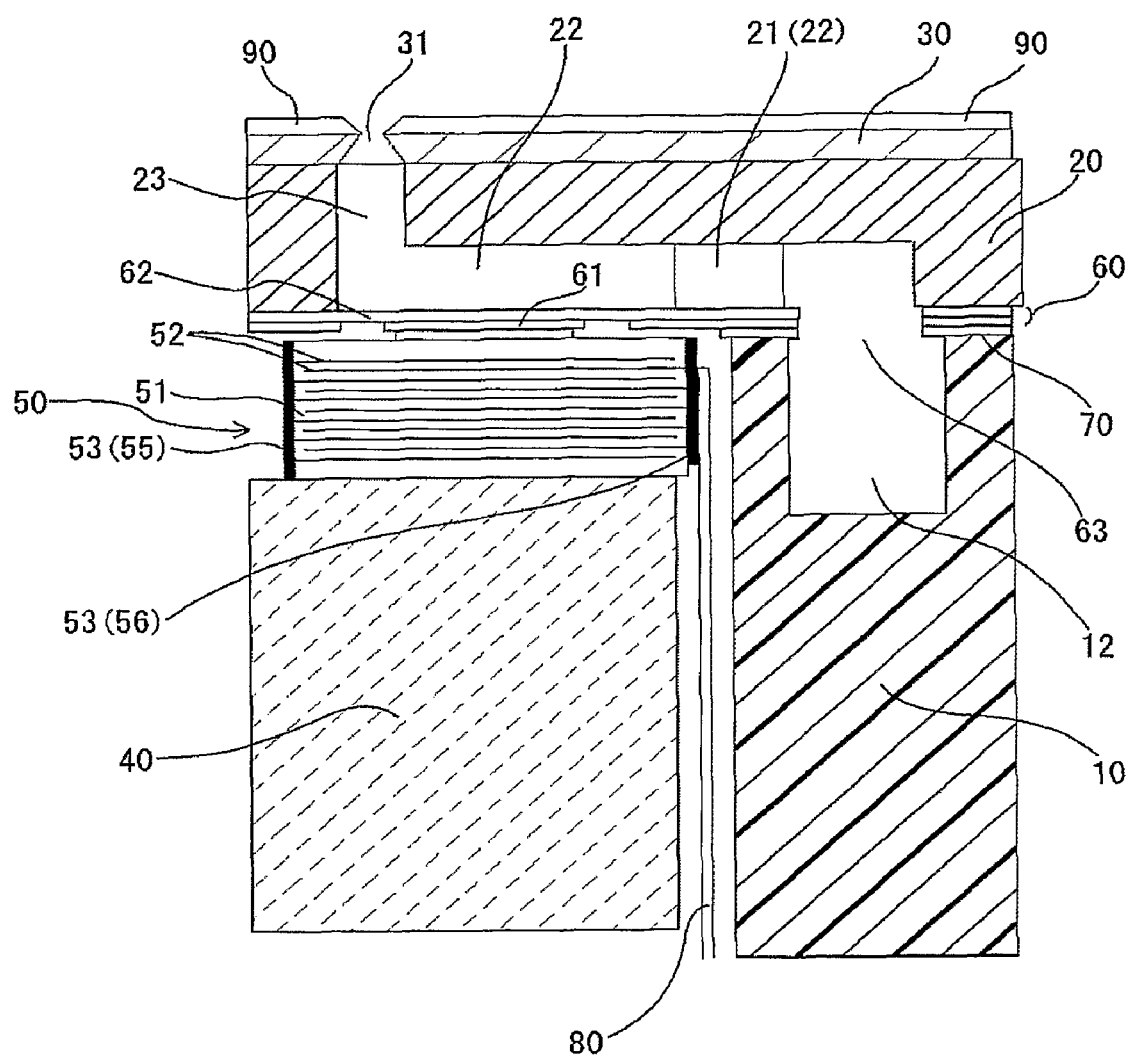
FIG. 6 is an elementary enlarged view showing an example of an inkjet head for use in the present invention.
Figure 7:
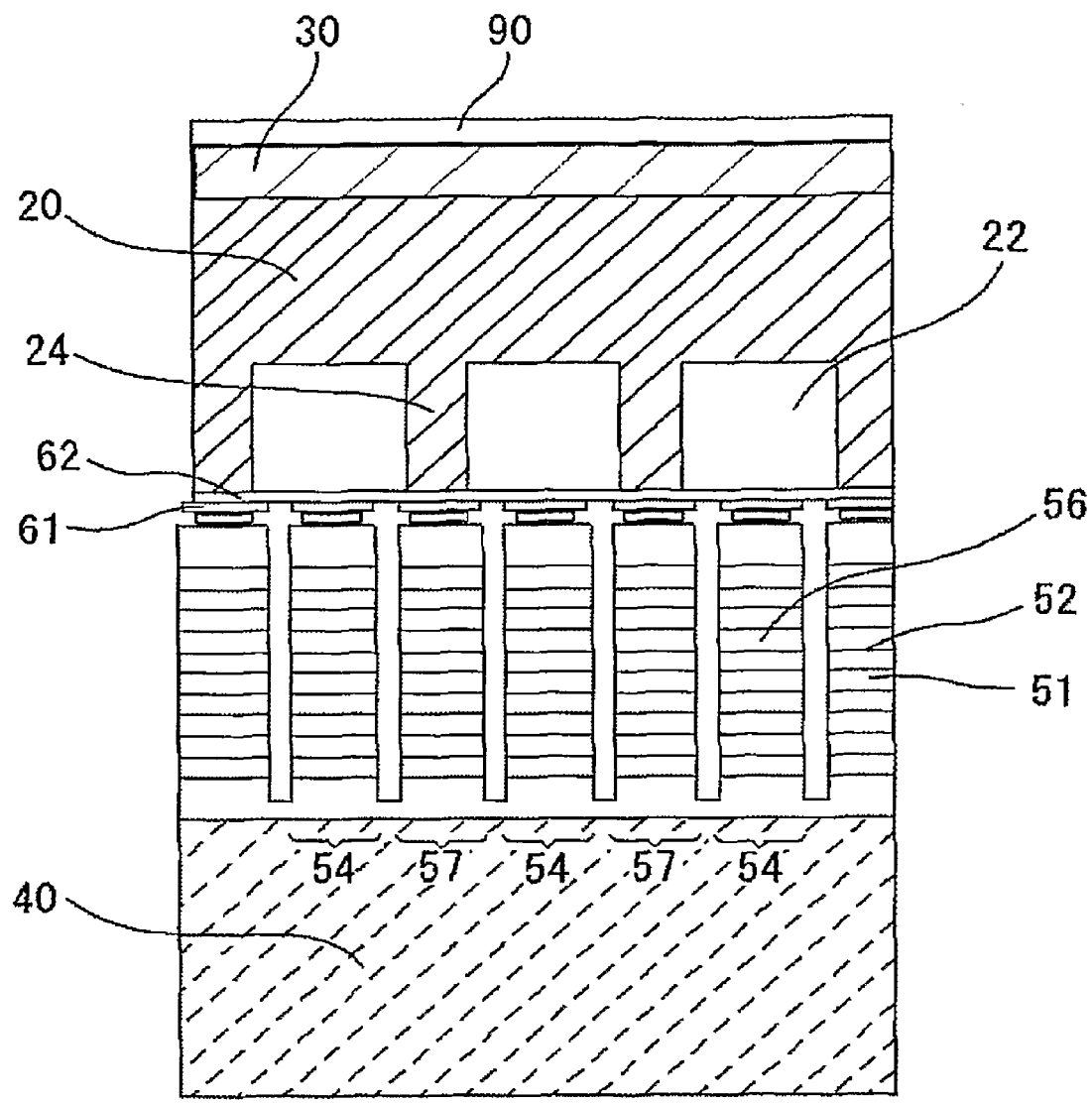
FIG. 7 is an enlarged view showing essential components of an example of an inkjet head for use in the present invention.

FIG. 6 is an elementary enlarged view of an inkjet head to which the present invention is applied, while FIG. 7 is an enlarged view of the essential components of the same inkjet head in the direction between channels.

This inkjet head is provided with a frame (10), in which an indentation is formed that serves as an ink feed port not shown (for supplying ink from the surface of FIG. 6 towards the back (direction of the back of the paper)) and a common liquid chamber (12), a channel plate (20), which forms a connecting port (23) that connects an indentation serving as a fluid resistance portion (21) and a pressurized liquid chamber (22) with a nozzle (31), a nozzle plate (30) that forms the nozzle (31), a vibrating plate (60) having a projection (61), a diaphragm (62) and an ink intake port (63), a multilayered piezoelectric device (50) joined to the vibrating plate (60) through an adhesive layer (70), and a base (40) to which the multilayered piezoelectric device (50) is fixed. The base (40) is made of a barium titanate-based ceramic, and joins the multilayered piezoelectric device (50) by arranging in two rows.

The multilayered piezoelectric device (50) has alternating layers of lead zirconate titanate (PZT) piezoelectric layers (51) having a thickness of 10 μm to 50 μm per layer, and internal electrode layers (52) composed of silver-palladium (AgPd) having a thickness of several μm per layer. The internal electrode layers (52) are connected to external electrodes (53) at both ends thereof.

The multilayered piezoelectric device (50) is divided into the shape of comb teeth by half-cut dicing, and each comb tooth is used as a drive portion (56) and a support portion (57) (non-drive portion) (FIG. 7).

The lengths of the outside ends of one of the two external electrodes (53) (external electrode in the direction of the surface or towards the back of the drawing (direction of the back of the paper) connected to one end of an internal electrode layer (52)) are restricted by notching or other processing so as to be divided by half-cut dicing, and these serve as a plurality of individual electrodes (54). The other ends are not divided by dicing and remain continuous to serve as common electrodes (55).

An FPC (80) is soldered to the individual electrodes (54) of the drive portion. In addition, the common electrodes (55) are connected to a ground (Gnd) electrode of the FPC (80) by passing around the end of the multilayered piezoelectric device by providing an electrode layer thereon. A driver IC not shown is mounted on the FPC (80), and a drive voltage applied to the drive portion (56) is controlled thereby. Furthermore, reference symbol 90 in FIGS. 6 and 7 indicates an ink-repellent layer.

The vibrating plate (60) forms a thin film diaphragm (62), the island-like projection (island portion) (61), which is joined with the multilayered piezoelectric device (50) while serving as a drive portion (56) formed in the center of this diaphragm (62), a thick film portion not shown containing a girder joined to a support, and an opening serving as the ink intake port (63) by laminating two nickel-plated layers by electroforming. The thickness of the diaphragm is 3 μm, and the width (one side) is 35 μm.

The island-shaped projection (61) of this vibrating plate (60), the moving portion (56) of the multilayered piezoelectric device (50), the vibrating plate (60) and the frame (10) are connected by adhering by patterning the adhesive layer (70) containing a gap material.

The channel plate (20) has an indentation serving as the fluid resistance portion (21) and the pressurized liquid chamber (22), and the connecting port (23) at a location corresponding to the nozzle (31), patterned by etching using a silicon single crystal substrate.

The portion remaining after etching serves as a partition (24) of the pressurized fluid chamber (22). In addition, a portion having a narrowed etching width is provided in this head that is used as the fluid resistance portion (21).

The nozzle plate (30) is formed with a material such as a nickel-plated film by electroforming, and forms a large number of minute discharge ports in the form of nozzle (31) for ejecting ink droplets. The internal shape of this nozzle (31) is formed in the shape of a horn (which may roughly in the shape of a column or circular truncated cone). In addition, the diameter of the nozzle (31) is roughly 20 μm to 35 μm on the ink droplet outlet side. In addition, the pitch of each row of nozzles is 150 dpi.

The ink discharge surface (nozzle surface side) of this nozzle plate (30) is provided with a water-repellent layer subjected to water-repellent surface treatment not shown. High image quality is obtained by stabilizing the shape of ink droplets and ejecting characteristics by providing a water-repellency treated film selected according to the properties of the ink by, for example, PTFE-Ni eutectoid plating or electrodeposition of a fluororesin, vapor deposition coating of an evaporable fluorine resin (such as fluorinated pitch), or application of a solvent of a silicone-based resin and a fluorine-based resin followed by baking. In addition, among these methods, although various materials are known as fluorine-based resins, favorable water repellency can be obtained by vapor deposition of a modified perfluoropolyoxetane (Daikin Industries, Ltd., trade name: Op Tool DSX) to a thickness of 30 Å to 100 Å.

The frame (10) that forms the indentation serving as the ink feed port and the common liquid chamber (12) is produced by resin molding.

In an inkjet head configured in this manner, by applying a drive waveform (pulsed voltage of 10 V to 50 V) corresponding to a recording signal to the drive portion (56), a displacement in the direction of layering is generated in the drive portion (56), the pressurized liquid chamber (22) is pressurized through the nozzle plate (30) causing an increase in pressure that results in discharge of ink droplets from the nozzle (31).

Subsequently, accompanying completion of discharge of ink droplets, ink pressure in the pressurized liquid chamber (22) decreases and negative pressure is generated within the pressurized liquid chamber (22) due to inertia of the flow of ink and the drive pulse discharge process, after which operation proceeds to an ink filling step. At this time, ink supplied from an ink tank flows into the common liquid chamber (12), passes through the fluid resistance portion (21) via the ink intake port (63), and is filled into the pressurized liquid chamber (22).

Although the fluid resistance portion (21) is effective in reducing residual pressure vibrations following discharge, it also causes resistance to refilling due to surface tension. Appropriate selection of the fluid resistance portion enables balance to be achieved between the reduction in residual pressure and refill time, thereby making it possible to shorten the time until operation proceeds to the next ink droplet discharge operation (driving period).

EXAMPLES

Synthesis Example 1

After adequately replacing the inner atmosphere of a 1 L flask equipped with a mechanical stirrer, thermometer, nitrogen gas intake tube, reflux tube and dropping funnel with nitrogen gas, 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., trade name: AS-6) and 0.4 g of mercaptoethanol were added to the flask, and then heated at 65° C. Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., trade name: AS-6), 3.6 g of mercaptoethanol, 2.4 g of azobisdimethylvaleronitrile and 18 g of methyl ethyl ketone was dropped into the flask over the course of 2.5 hours. After the completion of the dropping, a mixed solution of 0.8 g of azobisdimethylvaleronitrile and 18 g of methyl ethyl ketone was dropped into the flask over the course of 0.5 hours. After aging for 1 hour at 65° C., 0.8 g of azobisdimethylvaleronitrile were added followed by further aging for 1 hour. After the completion of the reaction, 364 g of methyl ethyl ketone were added to the flask to thereby obtain 800 g of a polymer solution having a concentration of 50%.

Synthesis Example 2

550 parts of MEK were placed in a reaction vessel of an automated polymerization reaction apparatus (Polymerization Tester Model DSL-2AS, Todoroki Sangyo Co., Ltd.) which contained the reaction vessel equipped with a refluxing device having a stirrer, a dropping device, a temperature sensor and a nitrogen intake device in the upper portion thereof, followed by replacing the inner atmosphere of the reaction vessel with nitrogen gas while stirring. After heating to 80° C. while maintaining the nitrogen atmosphere inside the reaction vessel, a mixed liquid of 75.0 parts by mass of 2-hydroxyethyl methacrylate, 77.0 parts by mass of methacrylic acid, 80.0 parts by mass of styrene, 150.0 parts by mass of butyl methacrylate, 98.0 parts by mass of butyl acrylate, 20.0 parts by mass of methyl methacrylate and 40.0 parts by mass of "Perbutyl (trademark) O" (active ingredient: tert-butyl peroxy-2-ethylhexanoate, Nippon Oils & Fats Co., Ltd.) was dropped in over the course of 4 hours by means of the dropping device. After the completion of dropping, the reaction was allowed to further react for 15 hours at the same temperature to thereby obtain an MEK solution of an anionic group-containing styrene-acrylic copolymer A having an acid value of 100, a weight average molecular weight of 21,000 and Tg (calculated) of 31° C. After the completion of the reaction, a portion of the MEK was distilled off under reduced pressure to thereby obtain a solution of copolymer A adjusted to a non-volatile content of 50%.

Preparation Example 1

After adequately stirring 28 g of the polymer solution produced in Synthesis Example 1, 26 g of carbon black (Monarch 880, Cabot Corp.), 13.6 g of a 1 mol/L potassium hydroxide solution, 20 g of methyl ethyl ketone and 30 g of ion exchange water, the mixture was kneaded using a 3-roll mill. The resulting paste was placed in 200 g of ion exchange water and adequately stirred followed by distilling off the methyl ethyl ketone and water using an evaporator to obtain an aqueous dispersion of water-insoluble vinyl polymer particles having a solid content of 20% by mass. The volume average particle diameter of the water-insoluble vinyl polymer particles containing carbon black was 70 nm.

Preparation Example 2

150 g of carbon black (Toka Black #7240, Tokai Carbon Co., Ltd.) were subjected to an oxidation treatment by adding the same to 3 L of an aqueous sodium persulfate solution having a concentration of 2 mol/L and stirring for 10 hours at a temperature of 60° C. The oxidized carbon black was subjected to ultrafiltration to remove residual salt. Subsequently, aqueous sodium hydroxide solution was added to adjust the pH to 8 followed by repeating ultrafiltration to remove excess salts and adding purified water to the resulting aqueous solution to adjust the solid content to 20%. The volume average particle diameter of the resulting carbon black containing $SO_3Na$ groups in the aqueous dispersion was 70 nm.

Preparation Example 3

1000 g of carbon black (#960, Mitsubishi Chemical Corp.), 800 parts of the solution of copolymer A obtained in Synthesis Example 2, 143 parts of a 20% aqueous sodium hydroxide solution, 100 parts of MEK and 1957 parts of water were placed in a mixing tank equipped with a cooling jacket, followed by stirring and mixing. The mixed liquid was passed through a dispersing apparatus (SC Mill Model SC100/32, Mitsui Mining Co., Ltd.) filled with zirconia beads having a diameter of 0.3 mm and then dispersed for 6 hours using a circulating method (containing returning the dispersion from the dispersion apparatus to the mixing tank). With the rotating speed of the dispersion apparatus at 2,700 rpm, water was passed through the cooling jacket to maintain the temperature of the dispersion at 40° C. or lower. After the completion of dispersion, the undiluted dispersion was extracted from the mixing tank and the mixing tank and dispersion apparatus flow paths were washed with 10,000 parts of water which was then combined with the undiluted dispersion to obtain a diluted dispersion. The diluted dispersion was placed in a glass distillation apparatus to distill off all of the MEK and a portion of the water. After allowing to cool on standing to the room temperature, 10% hydrochloric acid was dropped in while stirring to adjust the pH to 4.5 after which solids were filtered out with a Nutsche filtration apparatus and washed. After transferring the cake to a container and adding 200 parts of a 20% aqueous potassium hydroxide solution, the mixture was dispersed with a Disper (TK Homodisper Model 20, Tokushu Kika Kogyo Co., Ltd.) followed by addition of water to adjust the non-volatile content and obtain an aqueous pigment dispersion having a non-volatile content of 20% in which carbon black was dispersed in an aqueous medium in the form of composite particles coated with a carboxyl group-containing styrene-acrylic copolymer neutralized with potassium hydroxide. The average volume particle diameter of the aqueous pigment in the aqueous dispersion was 123 nm.

<Production of Substrate>

0.3% by mass slurry formulated as shown below was formed into paper with a Fourdrinier paper machine to produce a substrate having a basis weight of 79 g/m². Furthermore, an aqueous solution of oxidized starch was coated on the thus obtained substrate at a deposition amount of 1.0 g/m² on solid basis per side in the size press step of the papermaking process.

[Formula for the Slurry]

| | |
|---|---|
| Leaf bleached kraft pulp (LBKP) | 80 parts by mass |
| Needle Bleached kraft pulp (NBKP) | 20 parts by mass |
| Light calcium carbonate (trade name: TP-121, Okutama Kogyo Co., Ltd.) | 10 parts by mass |
| Aluminum sulfate | 1.0 parts by mass |
| Amphoteric starch (trade name: Cato 3210, Nippon NSC Ltd.) | 1.0 parts by mass |
| Neutral rosin sizing agent (trade name: NeuSize M-10, Harima Chemicals, Inc.) | 0.3 parts by mass |
| Yield improver (trade name: NR-11LS, Haimo Technologies, Inc.) | 0.02 parts by mass |

<Production of Recording Medium 1>

Pigments, adhesives, and an assistant were added. Specifically, 70 parts by mass of clay in which the proportion of particles having a particle diameter of 2 μm or less was 97% by weight and 30 parts by mass of heavy calcium carbonate having an average particle diameter of 1.1 μm as the pigment, 8 parts by mass of a styrene-butadiene copolymer emulsion having a glass transition temperature (Tg) of −5° C. and 1 part by mass of phosphoric acid-esterified starch as the adhesives, and 0.5 parts by mass of calcium stearate as the assistant were added followed by addition of water to prepare a coating liquid having a solid content concentration of 60% by mass.

The resulting coating liquid was coated onto both sides of the substrate produced above by means of a blade coater so that the deposition amount became 8 g/m² on solid basis per side, followed by hot air drying and staged supercalender treatment to thereby produce Recording Medium 1.

<Production of Recording Medium 2>

Pigments, adhesives, and an assistant were added. Specifically, 70 parts by mass of clay in which the proportion of particles having a particle diameter of 2 μm or less was 97% by mass and 30 parts by mass of heavy calcium carbonate having an average particle diameter of 1.1 μm as the pigments, 7 parts by mass of a styrene-butadiene copolymer emulsion having a glass transition temperature (Tg) of −5° C. and 0.7 parts by mass of phosphoric acid-esterified starch as the adhesives, and 0.5 parts by mass of calcium stearate as the assistant were added, followed by addition of water to prepare a coating liquid having a solid content concentration of 60% by mass.

The resulting coating liquid was coated onto both sides of the substrate produced above by means of a blade coater so that the deposition amount became 8 g/m² on solid basis per side, followed by hot air drying and staged supercalender treatment to thereby produce Recording Medium 2.

Example 1

An ink composition having the formula shown below was prepared, and an ink was produced by filtering with a membrane filter having an average pore diameter of 0.8 μm followed by evaluating the various properties thereof in the manner described below. The viscosity of this recording ink at 25° C. was 8 mPa·s (each of the recording inks of Examples 2 to 10 were also prepared to have a viscosity at 25° C. of 8 mPa·s).

<Ink Composition>

| | |
|---|---|
| Aqueous dispersion of water-insoluble vinyl polymer particles having an avergae volume particle diameter of 70 nm obtained in Preparation Example 1 | 12.0% by mass (solid content) |
| 3-methyl-1,3-butanediol | 21.0% by mass |
| Glycerin | 9.0% by mass |
| 2-pyrrolidone | 2.0% by mass |
| Surfactant of structural formula (II) | 1.0% by mass |
| Ion exchanged water | 55.0% by mass |

Evaluation of Properties

<Average Volume Particle Diameter of Colorant in Ink>

The average volume particle diameter (D50%) of the colorant contained in the prepared ink was measured using a particle size distribution measuring apparatus (Microtrack UPA, Nikkiso Co., Ltd.).

<Image Density>

Figure 3:
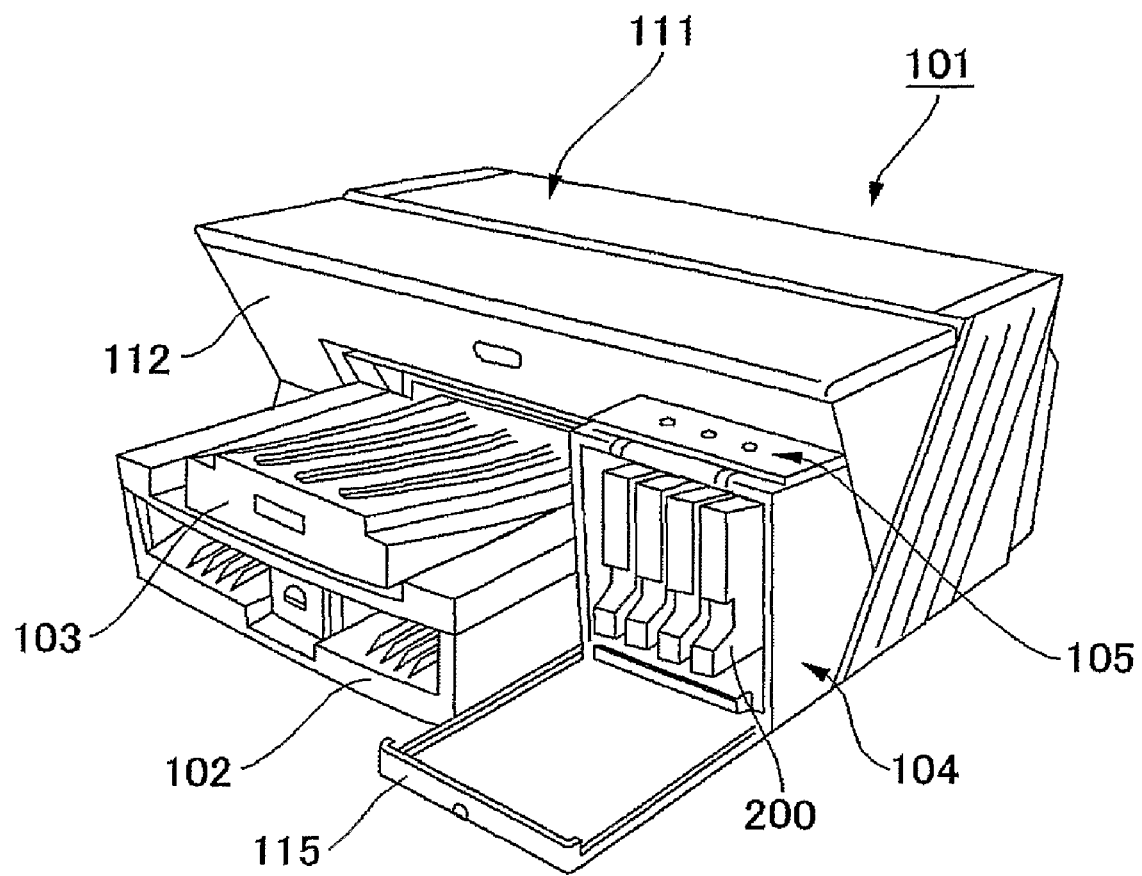
FIG. 3 is a perspective explanatory drawing of a state in which a cover of an ink cartridge loading unit of an inkjet recording apparatus is open.

The prepared ink was filled into the inkjet printer shown in FIGS. 3 to 5 and solid printing was carried out on glossy media in the form of Ricoh Business Coat Gloss 100 at a resolution of 1200 dpi. After drying, image density was measured using a reflecting calorimetric densitometer (X-Rite Corp.).

The adhered amount at this time was 9.5 g/m².

<Glossiness>

The prepared ink was filled into the inkjet printer shown in FIGS. 3 to 5 and solid printing was carried out on a glossy medium in the form of Ricoh Business Coat Gloss 100 (base: 60°, gloss: 21) at a resolution of 1200 dpi. After drying, 60° gloss was measured using the Micro-Gloss 60° Gloss Meter manufactured by Atlas Co., Ltd.

<Measurement of Amount of Pure Water Transfer by Dynamic Scanning Absorptometer>

The amount of pure water transfer of each recording medium was measured at 25° C. and 50% RH using a dynamic scanning absorptometer (Model K350 Series D, Kyowa Seiko Co., Ltd.). The transferred amounts at contact times of 100 ms and 400 ms were determined from a measured value of the transferred amount at a contact time approximating each contact time. Each of the recording media consisting of Ricoh Business Gloss 100, Aurora Coat, Recording Medium 1 and Recording Medium 2 all had thicknesses having a basis weight of 100 g/m².

TABLE 1

| | Amount of pure water transferred to a recording medium | |
|---|---|---|
| | (ml/m²) Contact time: 100 ms | (ml/m²) Contact time: 400 ms |
| Ricoh Business Gloss 100 | 3.1 | 3.5 |
| Aurora Coat | 2.8 | 3.4 |
| Recording Medium 1 | 10.1 | 20.2 |
| Recording Medium 2 | 25.2 | 28.5 |
| Lumilar U10 | 0.1 | 0.1 |
| Super Fine Special-Purpose Paper | 41.0 | 44.8 |

Example 2

An ink was produced in the same manner as Example 1, provided that the volume average particle diameter of the water-insoluble vinyl polymer particles containing carbon black in the preparation of the ink composition of Example 1 was changed from 70 nm to 50 nm. The resulting ink was evaluated in the same manner as Example 1.

Example 3

An ink was produced in the same manner as Example 1, provided that the volume average particle diameter of the water-insoluble vinyl polymer particles containing carbon black in the preparation of the ink composition of Example 1 was changed from 70 nm to 90 nm. The resulting ink was evaluated in the same manner as Example 1.

Example 4

An ink was produced in the same manner as Example 1, provided that the aqueous dispersion of water-insoluble vinyl polymer particles containing carbon black in the preparation of the ink composition of Example 1 was changed to the dispersion of the carbon black having a volume average particle diameter of 70 nm obtained in Preparation Example 2. The resulting ink was evaluated in the same manner as Example 1.

Example 5

An ink was produced in the same manner as Example 1, provided that the aqueous dispersion obtained in Preparation Example 1 in the preparation of the ink composition in Example 1 was changed to the aqueous dispersion obtained in Preparation Example 3. The resulting ink was evaluated in the same manner as Example 1.

Example 6

An ink was produced in the same manner as Example 1, provided that the added amount of the aqueous dispersion of water-insoluble vinyl polymer particles containing carbon black in the preparation of the ink composition of Example 1 was changed from 12.0% by mass to 8.0% by mass, and 4.0% by mass of silicone-modified acrylic resin fine particles were further added. The resulting ink was evaluated in the same manner as Example 1.

Example 7

An ink was produced in the same manner as Example 1, provided that the added amount of the aqueous dispersion of water-insoluble vinyl polymer particles containing carbon black in the preparation of the ink composition of Example 1 was changed from 12.0% by mass to 5.5% by mass, and 6.5% by mass of silicone-modified acrylic resin fine particles were further added. The resulting ink was evaluated in the same manner as Example 1.

Example 8

The ink composition prepared in Example 1 was evaluated in the same manner as Example 1, provided that the recording medium was changed from the glossy medium of Ricoh Business Coat Gloss 100 to Aurora Coat (Nippon Paper Co., Ltd.).

Example 9

The ink composition prepared in Example 1 was evaluated in the same manner as Example 1, provided that the recording medium was changed to Recording Medium 1.

Example 10

The ink composition prepared in Example 1 was evaluated in the same manner as Example 1, provided that the recording medium was changed to Recording Medium 2.

Comparative Example 1

An ink was produced and evaluated in the same manner as Example 1, provided that the volume average particle diameter of the water-insoluble vinyl polymer particles containing carbon black in the preparation of the ink composition of Example 1 was changed from 70 nm to 30 nm.

Comparative Example 2

An ink was produced and evaluated in the same manner as Example 1, provided that the volume average particle diameter of the water-insoluble vinyl polymer particles containing carbon black in the preparation of the ink composition of Example 1 was changed from 70 nm to 20 nm.

Comparative Example 3

An ink was produced and evaluated in the same manner as Example 1, provided that the volume average particle diameter of the water-insoluble vinyl polymer particles containing carbon black in the preparation of the ink composition of Example 1 was changed from 70 nm to 110 nm.

Comparative Example 4

An ink was produced and evaluated in the same manner as Example 1, provided that the volume average particle diameter of the water-insoluble vinyl polymer particles containing carbon black in the preparation of the ink composition of Example 1 was changed from 70 nm to 150 nm.

Comparative Example 5

An ink was produced and evaluated in the same manner as Example 1, provided that the added amount of the aqueous dispersion of water-insoluble vinyl polymer particles containing carbon black in the preparation of the ink composition of Example 1 was changed from 12.0% by mass to 3.0% by mass, and 9.0% by mass of silicone-modified acrylic resin fine particles were further added.

Comparative Example 6

The ink composition prepared in Example 1 was evaluated in the same manner as Example 1, provided that the recording medium from the glossy medium of Ricoh Business Coat Gloss 100 to a film base (Lumilar U10, Toray Industries, Inc.).

Comparative Example 7

The ink composition prepared in Example 1 was evaluated in the same manner as Example 1, provided that the recording medium was changed from the glossy medium of Ricoh Business Coat Gloss 100 to a glossy medium (Super Fine Special-Purpose Paper, Seiko Epson Corp.).

TABLE 2

| | Image Density | 60° Gloss |
|---|---|---|
| Example 1 | 2.60 | 70 |
| Example 2 | 2.34 | 75 |
| Example 3 | 2.27 | 63 |
| Example 4 | 2.07 | 51 |
| Example 5 | 2.34 | 61 |
| Example 6 | 2.62 | 68 |
| Example 7 | 2.65 | 71 |
| Example 8 | 2.09 | 58 |
| Example 9 | 2.15 | 62 |
| Example 10 | 2.26 | 64 |
| Comparative Example 1 | 1.95 | 44 |
| Comparative Example 2 | 1.85 | 43 |
| Comparative Example 3 | 1.92 | 45 |
| Comparative Example 4 | 1.81 | 35 |
| Comparative Example 5 | Immeasurable due to defective discharge | Immeasurable due to defective discharge |
| Comparative Example 6 | 1.75 | Immeasurable |
| Comparative Example 7 | 1.88 | 5 |

According to the results shown in Table 2, the recording inks of Examples 1 to 8 were determined to all have higher image density and superior glossiness on the glossy medium as compared with the recording inks of Comparative Examples 1 to 7.

The invention claimed is:

1. An inkjet recording ink and recording media set, comprising:
an inkjet recording ink; and
a recording medium,
wherein the inkjet recording ink comprises at least:
water;
a water-soluble organic solvent;
a water-insoluble vinyl polymer particle containing carbon black, and having an average volume particle diameter of 40 nm to 100 nm; and
resin fine particles,
wherein the inkjet recording ink has a mass ratio A/B of 1/0.05 to 1/1.2, where A represents an amount of the carbon black contained in the recording ink and B represents an amount of the resin fine particles contained in the recording ink,
wherein the recording medium comprises:
a substrate; and
a coating layer on at least one side of the substrate, and
wherein an amount of pure water transferred to the recording medium, as measured with a dynamic scanning absorptometer at 23° C. and 50% RH, at a contact time of 100 ms is 2 ml/m$^2$ to 35 ml/m$^2$ while an amount of pure water transferred to the recording medium at a contact time of 400 ms is 3 ml/m$^2$ to 40 ml/m$^2$.

2. The inkjet recording ink and recording media set according to claim 1, wherein the resin fine particles have an average volume particle diameter of 10 nm to 300 nm.

3. The inkjet recording ink and recording media set according to claim 2, wherein the resin fine particles contain acrylic resin, methacrylic resin, styrene resin, urethane resin, acrylamide resin, polyester resin, butadiene resin or a mixture thereof.

4. The inkjet recording ink and recording media set according to claim 1, wherein the carbon black is coated with a water-insoluble vinyl polymer.

5. The inkjet recording ink and recording media set according to claim 1, wherein the carbon black has a hydrophilic group on the surface thereof, and the hydrophilic group is a functional group selected from the group consisting of —COOM, —SO$_3$M, —PO$_3$HM, —PO$_3$M$_2$, —SO$_2$NH$_2$ and —SO$_2$NHCOR, wherein M represents a hydrogen atom, alkaline metal, ammonium or organic ammonium, and R represents an alkyl group having 1 to 12 carbon atoms, a substituted or unsubstituted phenyl group, or a substituted or unsubstituted naphthyl group.

6. The inkjet recording ink and recording media set according to claim 1, wherein the carbon black is dispersed in the inkjet recording ink by a surfactant.

7. The inkjet recording ink and recording media set according to claim 1, wherein the carbon black has a graft polymer group on the surface thereof.

8. The inkjet recording ink and recording media set according to claim 1, wherein the inkjet recording ink comprises a polymeric dispersant having an anionic group or cationic group on the surface thereof, or the carbon black has a surface which is directly or indirectly coated with a compound having an anionic group or cationic group.

9. The inkjet recording ink and recording media set according to claim 1, wherein the inkjet recording ink further comprises a surfactant.

10. The inkjet recording ink and recording media set according to claim 1, wherein the inkjet recording ink has a solid content of 5% by mass to 30% by mass.

11. The inkjet recording ink and recording media set according to claim 1, wherein the inkjet recording ink has a viscosity of 5 mPa·s to 20 mPa·s at 25° C.

12. The inkjet recording ink and recording media set according to claim 1, wherein the water-soluble organic solvent is at least one selected from the group consisting of glycerin, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone.

13. The inkjet recording ink and recording media set according to claim 1, wherein the coating layer of the recording medium has a deposition amount of 0.5 g/m$^2$ to 20.0 g/m$^2$ on solid basis, and a basis weight of 50 g/m$^2$ to 250 g/m$^2$.

14. An inkjet recording method comprising:
depositing an inkjet recording ink on a recording medium at an amount of 1.5 g/m² to 15 g/m² so as to perform an inkjet recording, using an inkjet recording ink and recording media set which comprises
an inkjet recording ink; and
a recording medium,
wherein the inkjet recording ink comprises at least:
  water;
  a water-soluble organic solvent;
  a water-insoluble vinyl polymer particle containing carbon black, and having an average volume particle diameter of 40 nm to 100 nm; and
resin fine particles,
wherein the inkjet recording ink has a mass ratio A/B of 1/0.05 to 1/1.2, where A represents an amount of the carbon black contained in the recording ink and B represents an amount of the resin fine particles contained in the recording ink,
wherein the recording medium comprises:
  a substrate; and
  a coating layer on at least one side of the substrate, and
wherein an amount of pure water transferred to the recording medium, as measured with a dynamic scanning absorptometer at 23° C. and 50% RH, at a contact time of 100 ms is 2 ml/m² to 35 ml/m² while an amount of pure water transferred to the recording medium at a contact time of 400 ms is 3 ml/m² to 40 ml/m².

15. An inkjet recorded matter, having an image density of 2.0 or more and a glossiness of 50 or more at 60° in a solid image part,
wherein the inkjet recorded matter is recorded in accordance with an inkjet recording method comprising
depositing an inkjet recording ink on a recording medium at an amount of 1.5 g/m² to 15 g/m² so as to perform an inkjet recording, using an inkjet recording ink and recording media set which comprises
an inkjet recording ink; and
a recording medium,
wherein the inkjet recording ink comprises at least:
  water;
  a water-soluble organic solvent;
  a water-insoluble vinyl polymer particle containing carbon black, and having an average volume particle diameter of 40 nm to 100 nm; and
resin fine particles,
wherein the inkjet recording ink has a mass ratio A/B of 1/0.05 to 1/1.2, where A represents an amount of the carbon black contained in the recording ink and B represents an amount of the resin fine particles contained in the recording ink,
wherein the recording medium comprises:
  a substrate; and
  a coating layer on at least one side of the substrate, and
wherein an amount of pure water transferred to the recording medium, as measured with a dynamic scanning absorptometer at 23° C. and 50% RH, at a contact time of 100 ms is 2 ml/m² to 35 ml/m² while an amount of pure water transferred to the recording medium at a contact time of 400 ms is 3 ml/m² to 40 ml/m².

* * * * *